US012546795B2

(12) United States Patent
Hassell

(10) Patent No.: US 12,546,795 B2
(45) Date of Patent: Feb. 10, 2026

(54) METHOD, SYSTEM, AND SENSOR DEVICE FOR MONITORING FOAM IN VESSEL

(71) Applicant: Nirrin Technologies, Inc., Billerica, MA (US)

(72) Inventor: Bryan A. Hassell, Cambridge, MA (US)

(73) Assignee: Nirrin Technologies, Inc., Billerica, MA (US)

( * ) Notice: Subject to any disclaimer, the term of this patent is extended or adjusted under 35 U.S.C. 154(b) by 880 days.

(21) Appl. No.: 17/651,280

(22) Filed: Feb. 16, 2022

(65) Prior Publication Data

US 2022/0260604 A1    Aug. 18, 2022

Related U.S. Application Data

(60) Provisional application No. 63/149,880, filed on Feb. 16, 2021.

(51) Int. Cl.
*G01N 35/10* (2006.01)
*G01P 15/03* (2006.01)
(Continued)

(52) U.S. Cl.
CPC ........ *G01N 35/1016* (2013.01); *G01P 15/034* (2013.01); *G01P 21/025* (2013.01); *G06N 20/00* (2019.01); *G01N 2035/1018* (2013.01)

(58) Field of Classification Search
CPC ........... G01J 1/18; G01N 33/38; G01N 21/15; G01N 21/27; G01N 33/14; H04W 4/80;
(Continued)

(56) References Cited

U.S. PATENT DOCUMENTS 5,597,950 A * 1/1997 Mullen ................. G01N 27/06
73/866
2013/0207006 A1   8/2013 Weiler
(Continued)

FOREIGN PATENT DOCUMENTS

EP        3 601 520 B1    5/2021
KR    2020 0106389 A      9/2020
(Continued)

OTHER PUBLICATIONS

International Search Report and Written Opinion of the International Searching Authority, mailed on May 16, 2022, from International Application No. PCT/US2022/070675, filed on Feb. 16, 2022. 15 pages.
(Continued)

*Primary Examiner* — Brandi N Hopkins
(74) *Attorney, Agent, or Firm* — HoustonHogle LLP

(57) ABSTRACT

A foam sensor device is used for monitoring foam within a vessel. The sensor (e.g. accelerometer) is encapsulated inside a water-tight, sterilizable, shell, which floats on a liquid contained. In one example, the foam sensor device includes an accelerometer for detecting and measuring rotation and movement of the foam sensor device and generates movement data based on the detected movement. During a learning or calibration process, sensor data (e.g., movement data) from the foam sensor device is analyzed and classified using machine learning and/or signal processing methods to extract features indicative of different possible foam statuses, including varying levels of foam, or no foam and generate models for the different statuses. During normal operation, the foam sensor device transmits sensor data to an analyzer containing the pre-calibrated models, which determines whether there is foam or not. Based on the foam status, a pump controller adds anti-foam solution.

20 Claims, 22 Drawing Sheets

(51) Int. Cl.
 *G01P 21/02*          (2006.01)
 *G06N 20/00*          (2019.01)
(58) Field of Classification Search
 CPC .......... B01D 19/00; B01D 19/04; B05B 7/00;
   B05B 13/02; G01F 23/292; C12M 1/00;
    C12M 1/21; C12M 1/36; G06K 9/00;
              H04N 7/18
 See application file for complete search history.

(56)           References Cited

U.S. PATENT DOCUMENTS

2017/0016874 A1    1/2017  Radjy
2017/0348616 A1   12/2017  Kisty
2018/0252692 A1    9/2018  Canty et al.

FOREIGN PATENT DOCUMENTS

WO     WO-2018044748 A1 *  3/2018  ............ C12M 23/14
WO     WO 2019/103976 A1   5/2019

OTHER PUBLICATIONS

International Preliminary Report on Patentability, mailed on Aug. 31, 2023, from International Application No. PCT/US2022/070675, filed on Febraury 16, 2022. 9 pages.

* cited by examiner

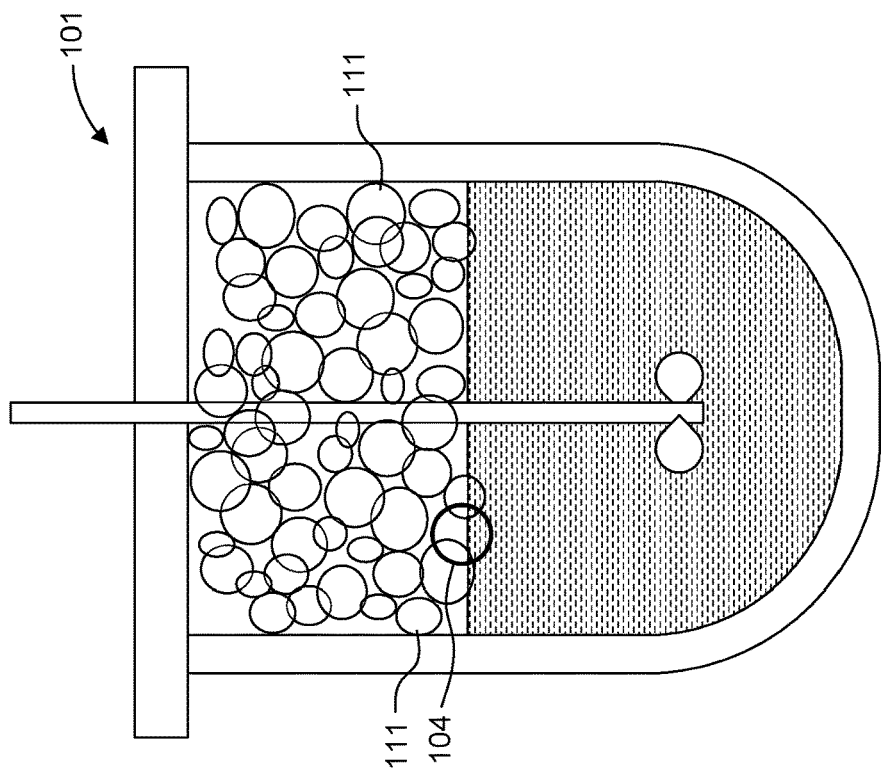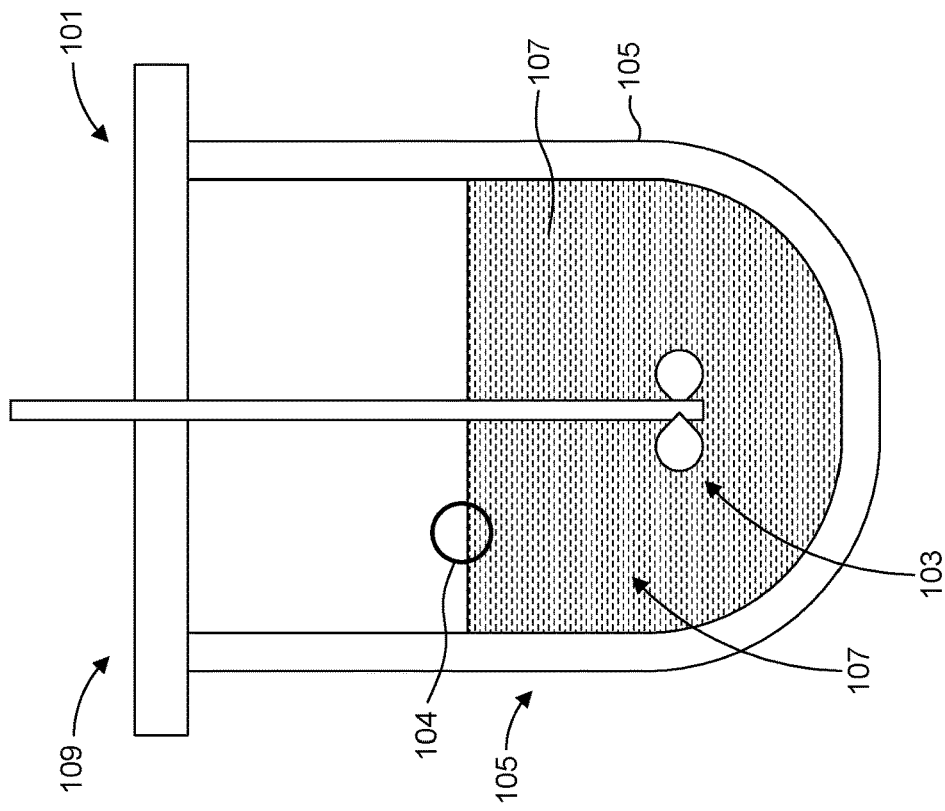
FIG. 1A
FIG. 1B

METHOD, SYSTEM, AND SENSOR DEVICE FOR MONITORING FOAM IN VESSEL

RELATED APPLICATIONS

This application claims the benefit under 35 USC 119(e) of U.S. Provisional Application No. 63/149,880, filed on Feb. 16, 2021, which is incorporated herein by reference in its entirety.

BACKGROUND OF THE INVENTION

Many processes in the chemical, biochemical, pharmaceutical, food, beverage and in other industries require some type of monitoring. Typically, the processes are conducted in a vessel, e.g., a bioreactor. The contents of the bioreactor can change as the process unfolds and data collected at various stages can be used to monitor, adjust and/or control process parameters.

SUMMARY OF THE INVENTION

Bioreactor processes or runs often result in foam forming inside of a vessel of the bioreactor. This foam can present several problems, including clogging filters or causing bags of the reactors to rupture. Thus, end users typically add an anti-foam solution to mitigate foam build-up. However, too much of this anti-foam solution can affect the chemical and biological processes and/or contents of the bioreactor runs (e.g., cells) as well as the reactor itself.

Thus, a need exists for a sensor for monitoring foam levels in a vessel during a bioreactor process to detect when foam is building up so that anti-foam solution can be automatically added to the vessel at the appropriate level.

In specific embodiments, sensors for monitoring foam levels are configured to accommodate dynamic conditions within the vessel. For example, during bioreactor runs, liquid levels within the vessel can rise and fall. Additionally, foam levels also rise and fall, as foam is produced and/or anti-foam solution is added. For this reason, conventional in-situ-style probes do not work well for monitoring foam, because they are unable to compensate for moving fluid levels and moving foam levels.

Presently disclosed is a robust and effective foam sensor device for monitoring foam within a vessel. In one implementation, the device uses one or more accelerometers. For example, the accelerometer can be similar to those commonly used in smart watches and smart phones. The accelerometer can be encapsulated inside a water-tight, preferably sterilizable, shell or housing, in the shape of a sphere (ball), for example, which floats on the liquid level and therefore can function regardless of any upward or downward movement (e.g., as the liquid level moves up and down). The accelerometers track rotation and movement of the sphere and generate movement data. During a learning or calibration process, this movement data is analyzed and classified using machine learning and/or signal processing methods to extract features indicative of different possible foam conditions, states or statuses, including varying levels of foam, or no foam, and generate models for the different statuses. During normal operation (e.g., bioreactor runs), the foam sensor device transmits movement data to an analyzer containing the pre-calibrated models, to determine the presence or absence of foam, and, in many cases, the amount of foam. Based on the foam status, a pump controller adds anti-foam solution.

In addition to a spherical ball the housing can have a cylindrical, ellipsoidal, conical or another shape.

The foam sensor device can include a battery or other electrical storage device, such as a super capacitor, e.g., inside of the sensor shell, for providing power to the sensor device. Since the device may need to run continuously in a sterile bioreactor, possibly for months, replacing the batteries or the entire foam sensor device could be difficult or impossible. Thus, according to one embodiment, the foam sensor device also includes a parasitic power device, such as kinetic charger, for charging the battery from the movement of the sensor device, as, typically, the foam sensor device will be moving during operation. In other examples, the device includes an inductive power receiver for receiving power transmitted inductively.

In general, according to one aspect, the invention features a method for monitoring foam within a vessel. Movement of a sensor device within the vessel is detected via an accelerometer, and movement data is generated based on the detected movement. A foam status of the vessel is then determined based on the movement data.

In some embodiments, the vessel is part of a bioreactor, and the sensor device floats on liquid contained within the vessel and comprises a water-tight housing.

The movement data indicates acceleration and angular velocity around each of the x-, y-, and z-axes and rotation information including pitch, yaw, and roll.

The foam status is determined based on the movement data and stored foam models associated with different foam statuses. These foam models can be generated using machine learning and/or signal processing methods. In one example, the foam models are generated based on movement data generated during one or more controlled states of the vessel, during which the foam status of the vessel is known. The known foam status can be provided along with other controlled state information, including, for example, the viscosity of the cell culture medium and/or that of the foam. The foam models are generated based on the controlled state information and the movement data generated during the controlled states by extracting features of the movement data for each controlled state and classifying the extracted features as being associated with different foam statuses based on the controlled state information.

Anti-foam solution is added to the vessel based on the foam status in many implementations.

In general, according to another aspect, the invention features a system for monitoring foam within a vessel. The system includes a sensor device and a detection module. The sensor device comprises an accelerometer for generating movement data based on detected movement of the sensor device, and the detection module determines a foam status of the vessel based on the movement data.

In general, according to a further aspect, the invention features a sensor device for monitoring foam within a vessel. The device includes an accelerometer for generating movement data based on detected movement of the sensor device. A detection module (e.g., executing on a control device) determines a foam status of the vessel based on the movement data.

In one embodiment, the sensor device further includes a battery for providing power to the sensor device and, optionally, a kinetic charger for charging the battery from the movement of the sensor device.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 1A is a cross sectional view of an exemplary vessel showing a foam sensor floating on a liquid contained within the vessel;

FIG. 1B is a cross sectional view of the exemplary vessel of FIG. 1A showing a build-up of foam above the liquid;

DETAILED DESCRIPTION OF THE PREFERRED EMBODIMENTS

Figure 1C:
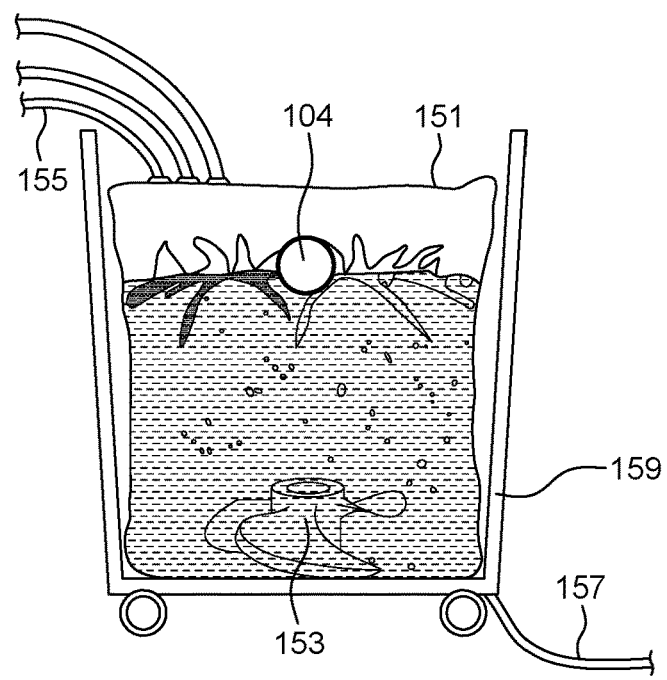
FIG. 1C is a cross sectional view of an exemplary flexible vessel showing a foam sensor floating on a liquid contained within the vessel.

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In general, the presently disclosed invention relates to an arrangement and/or method for monitoring an ongoing process, particularly a biological process, within a vessel of a bioreactor. Bioreactors can feature a suitable design and can be characterized by a specific volume or dimensions, as known in the art or as developed in the future. Examples of processes that can be monitored include cell growth protocols, fermentations, and so forth. In one implementation, techniques described herein are practiced with a bioreactor that houses or is a cell culture system for the three-dimensional assembly, growth and differentiation of cells and tissues. The bioreactor can contain cells, culture media, nutrients, metabolites, enzymes, hormones, cytokines and so forth.

Bioreactor processes or runs often result in foam forming inside a vessel of the bioreactor, for example, as a layer above a liquid contained by the vessel. The present invention relates to monitoring foam levels in the vessel during a bioreactor process to detect when foam is building up and adding (e.g., automatically) anti-foam solution to the vessel at an appropriate level.

In specific aspects, the invention is directed to techniques and equipment for monitoring the formation of a foam in a bioreactor. The method relies on a foam sensor device that, in many cases, is configured to float on the surface of a fluid present in a reactor vessel. For stirred reactors, the device often is found to gravitate to the vortex generated by the stirring operation.

In the absence of foam, the motion of the floating device settles into an equilibrium. As foaming develops, the foam interacts with the device (typically the exterior of the device), altering the motion (e.g., acceleration and rotation) of the device. As foam sticks to the foam sensor device, the device with foam sticking onto its surface will tend to behave as a single unit and rotate about the stir axis more slowly. The foam dampens acceleration, slowing swings, widening range. Bubbles collapse stochastically, causing a motion that is distinct from the no-foam steady state. The change in motion can be used as a trigger for further action.

In general, FIGS. 1A and 1B are cross sectional views of an exemplary vessel 101 to which the present invention is applicable.

In the illustrated example, the vessel is part of a stirred tank reactor, which can be a continuous, semi-continuous or batch type. The stirred tank reactor is provided with a motorized impeller 103, which, generally, rotates in order to stimulate movement in a fluid such as liquid 107 (e.g., a culture medium) contained within the vessel. The vessel comprises walls 105 on the sides and bottom for containing the liquid 107 and a headplate 109 for enclosing and/or sealing the liquid within the vessel. A foam sensor device 104 (a floating bobber, for example) floats on the liquid and generates sensor data based on conditions within the vessel.

In the example illustrated in FIG. 1A, there is no foam within the vessel. The foam sensor device 104 floats on top of the liquid, with a bottom portion of the device in contact with the liquid and a top portion surrounded by and in contact with a layer of gas (e.g., air) above the liquid.

In the example illustrated in FIG. 1B, a layer of foam 111 has formed on top of the liquid 107 in the vessel, for example, as a result of processes conducted in the bioreactor. The foam sensor device 104 floats on top of the liquid 107 but is now surrounded by and in contact with the layer of foam 111 on top of the liquid. The presence of the foam affects conditions detected via the foam sensor device 104 (relative to conditions that would be detected if there were no foam or a different level of foam) and thus is reflected in the sensor data generated by the foam sensor device 104.

In some examples, the weight and size of the foam sensor device 104 is such that it floats on the liquids but will not float on the foam. As foaming occurs during operation, the device will be at an interface between liquid and foam. In other examples, however, the weight and size of the foam sensor device 104 are selected such that it will float on some or possibly all of the different foams that could form on the liquid.

In general, based upon the sensor data generated by the foam sensor device 104, a foam status of the vessel (e.g., whether there is foam or if no foam is present, and, in some cases, the varying levels of foam) is determined. Anti-foam solution can be added to the vessel based on the foam status. For a particular bioreactor process, during a calibration process, the sensor data generated by the foam sensor device 104 in controlled conditions (e.g., when the foam status within the vessel is known a priori and provided as controlled state information) is analyzed (e.g., using machine learning and/or signal processing methods) in order to generate foam models that relate the movement (motion) of the device to an amount of foam in the vessel. In turn, the foam models are then used to analyze sensor data that is generated during normal operation of the bioreactor (e.g., during actual bioreactor runs) in order to determine the foam status of the vessel.

The vessel illustrated in FIGS. 1C (no foam case) and 1D (with foam formation) is a flexible vessel, namely bag 151, such as typically employed in single use bioreactors. Bag 151 can be made of a biocompatible plastic material. Integrated in the bag is stirrer 153, which can be driven mechanically or magnetically. Foam sensor device 104 can be enclosed in the bag, prior to sterilization, for example. Ingredients can be added or withdrawn from bag 151 via conduits (made of plastic tubing, for example) 155 and 157, respectively. During use, the bag is mounted in bioreactor 159.

Figure 2:
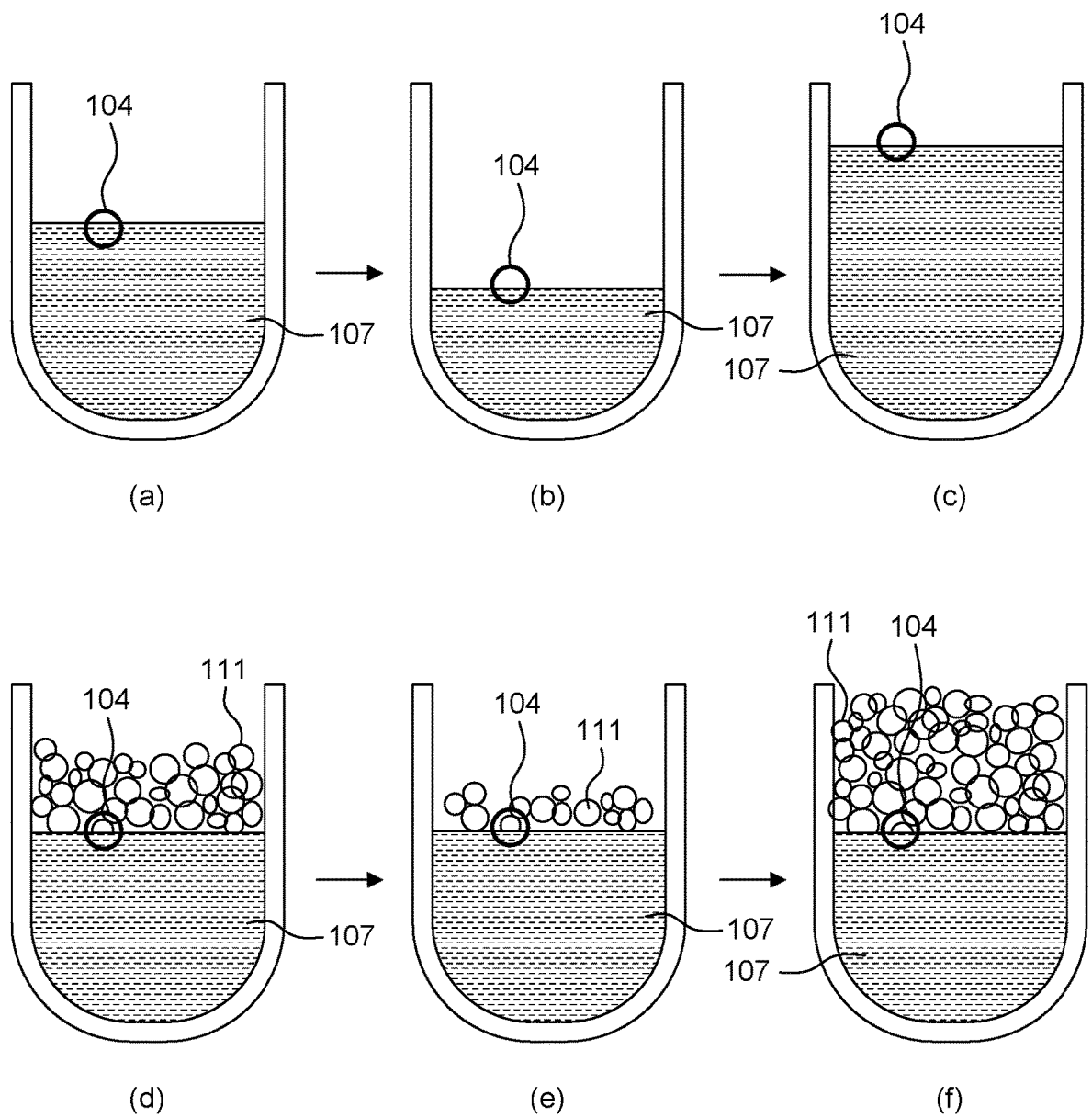
FIG. 2 is a cross sectional view of exemplary vessels (a) through (f) with varying levels of liquid and foam.

FIG. 2 shows the dynamic nature of certain conditions within the vessels. For example, during bioreactor runs, liquid levels within the vessel can rise and fall. Additionally, foam levels also can rise and fall, as foam is produced and/or anti-foam solution is added. The illustrated examples show the vessel with different liquid levels and different foam levels. In each case, the foam sensor device 104 floats on top of the liquid and thus rises and falls with the liquid level. Similarly, the foam sensor device comes in contact with the foam layer regardless of how much foam there is. In this way, the foam sensor device accommodates dynamic conditions within the vessel including changing liquid and foam levels.

In more detail, examples (a) through (c) illustrate, respectively, an initial level of liquid 107 that decreases or increases during the operation of the bioreactor. While no foam is being formed in these three cases, examples (d) through (f) show different degrees of foaming, with an intermediate foam (111) level, a relatively low and a relatively high foam (111) level, respectively.

According to a preferred embodiment, the foam sensor device 104 comprises an accelerometer and preferably a 3 or 6-axis accelerometer for tracking movement. A 3-axis accelerometer measures the accelerations that take place in relation to the 3 Cartesian coordinate axes (XYZ). Such accelerometers often include three crystals positioned so that each one reacts to vibration in a different axis. A 6-axis accelerometer (sometimes referred to as a 6-axis gyroscope) is provided with 6 degrees of freedom, having three axes to measure the rate of turn and another set of three axes to measure the acceleration. Thus, it combines a 3 Cartesian coordinate axis accelerometer with a sensor that takes gyroscopic measurements along these three axes: pitch, roll and yaw. Any number of 3- and 6-axis accelerometers, including many that are commercially available, can be utilized.

One illustrative example employs a Xadow 6DOF IMU (inertial measurement unit), which is an integrated 6-axis motion tracking device, that combines a 3-axis gyroscope, 3-axis accelerometer, and a Digital Motion Processor™ (DMP).

However, the foam sensor device 104 can operate based on a variety of principles in addition to movement, and/or can include a variety of different sensors, generating different types of sensor data.

Figure 3:
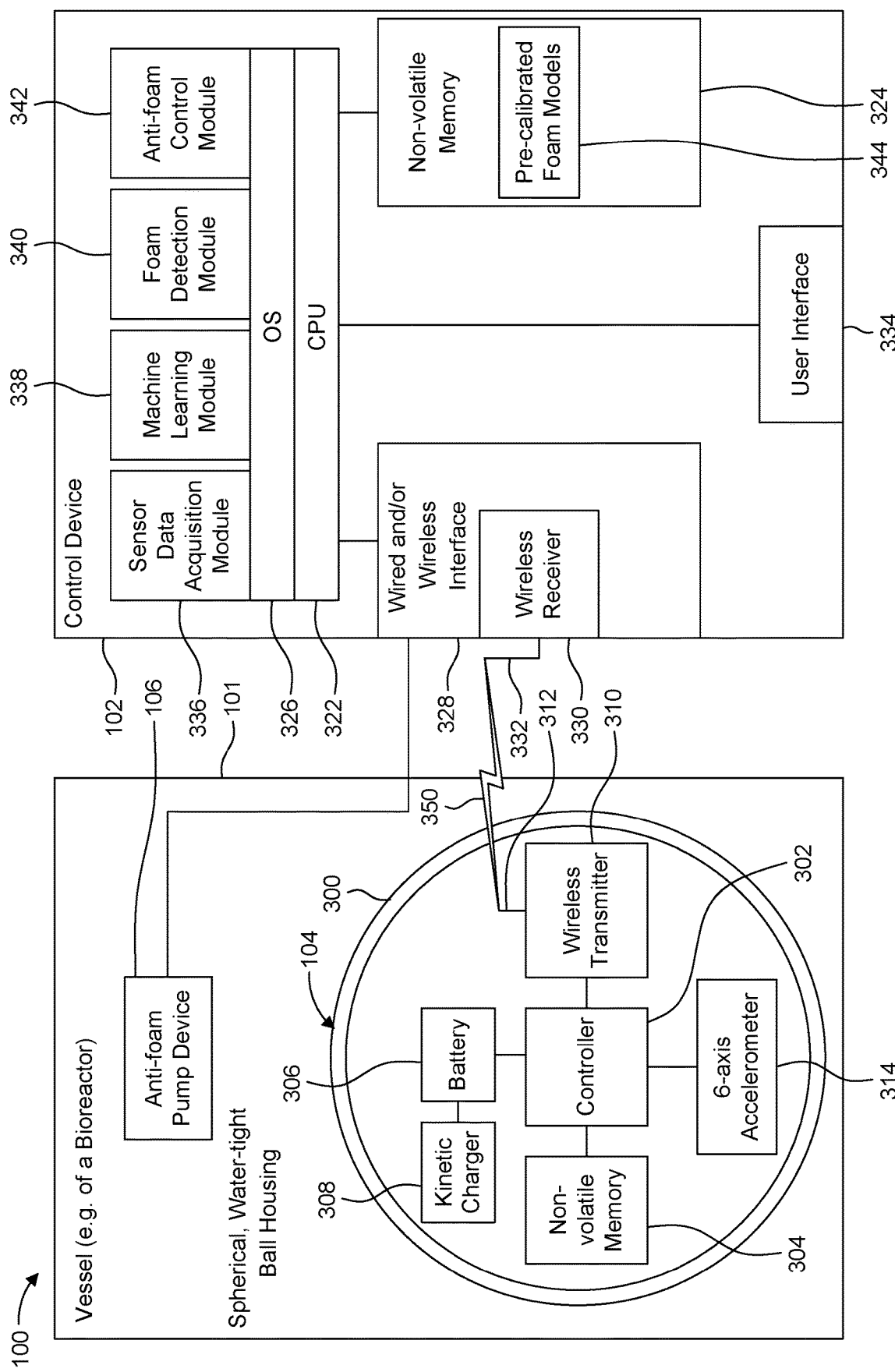
FIG. 3 is a schematic diagram of a foam monitoring system according to an embodiment of the present invention.

FIG. 3 is a schematic diagram of a foam monitoring system 100 according to a preferred embodiment of the present invention.

In general, a vessel (vessel 101 of a bioreactor, for example) containing a liquid (and possibly foam) includes the foam sensor device 104 floating on top of the liquid and an anti-foam pump device 106. The foam sensor device 104 generates sensor data and transmits the sensor data to a control device 102. The control device 102 performs a calibration process based on sensor data generated during controlled conditions, determines the foam status of the vessel based on the sensor data generated during normal operation, and controls the anti-foam pump device 106 based on the foam status. The anti-foam pump device 106 adds anti-foam solution to the vessel by activating or deactivating an anti-foam pump based on instructions from the control device 102.

More particularly, the foam sensor device 104 comprises a housing (also referred to herein as "shell") 300. Typically, housing 300 is water-tight and allows the foam sensor device to float on top of the liquid by, for example, keeping the liquid from penetrating into an inside portion of the foam sensor device 104 and preventing air within the inside portion of the foam sensor device 104 from escaping. In this way, the water-tight housing 300 maintains buoyancy of the foam sensor device 104 and protects electrical components within the foam sensor device 104 from becoming damaged by the liquid contained in the vessel.

Housing 300 can be constructed from a suitable material, a biocompatible plastic, for example. It can have dimensions and a wall thickness configured to fit a particular vessel design and/or process. Optimizations can address specific equipment and operational parameters.

The housing 300 can take any number of shapes, as further described below. In the illustrated example, the water-tight housing 300 is spherical or ball-shaped, allowing the foam sensor device 104 to roll or rotate on the surface of the liquid with only minimal resistance and with constant resistance in any direction.

The foam sensor device 104 includes a controller 302, non-volatile memory (NVM) 304, a wireless transmitter 310, an accelerometer 314, a battery 306, and a kinetic charger 308.

The controller 302 executes firmware/operating system instructions and generally directs the functionality of the foam sensor device. In one example, the controller 302 is a small single-board computer. In other examples, the controller 302 is a microcontroller unit or a system on a chip (SoC), including one or more processor cores along with memory and programmable input/output peripherals such as analog to digital converters and digital to analog converters.

The wireless transmitter 310 provides connectivity with the control device 102 via a wireless communication link 350. More specifically, the wireless transmitter 310 transmits sensor data generated by the foam sensor device 104 to the control device 102 via an antenna 312.

The accelerometer 314 is a six-axis accelerometer for detecting and measuring motion, changes in position, and acceleration of the foam sensor device. The foam sensor device 104 generates sensor data, specifically movement data, based on movement of the foam sensor device 104 detected by the accelerometer 314. In specific examples, the movement data indicates acceleration along an x-, y-, and z-axis and rotation information including pitch, yaw, and roll around each of the three axes.

The non-volatile memory 304 stores the sensor data (e.g., movement data) generated by the foam sensor device 104 via the accelerometer 314. In one example, the foam sensor device 104 logs the sensor data continuously in memory 304 and sends the sensor data to the control device 102 at predetermined intervals or in response to instructions from the control device 102.

The battery 306 provides power to the electrical components of the foam sensor device 104.

The kinetic charger 308 charges the battery 306 from the movement of the foam sensor device 104 such that the battery 306 does not need replacement or recharging from an electrical source.

The control device 102 includes a central processing unit (CPU) 322, nonvolatile memory 324, a wired and/or wireless network interface 328, and a user interface 334.

The wired and/or wireless network interface 328 provides connectivity with the foam sensor device 104 via the wireless communication link 350, such as Bluetooth and with the anti-foam pump device 106. The wired and/or wireless network interface 328 includes a wireless receiver 330 for receiving the sensor data (e.g., movement data) from the foam sensor device 104 via an antenna 332.

The user interface 334 enables users to interact with the control device. The user interface 334 can include any combination of output devices, such as a display on which a graphical user interface can be presented and/or speakers, and input devices, such as a touch screen display, keyboard, mouse or other pointing device, and/or a microphone. The control device 102 receives controlled state information for different controlled states of the vessel during the calibration process via the user interface 334, including known information about the foam status of the vessel during each controlled state.

The CPU 322 executes firmware instructions and an operating system (OS) 326 generally directs the functionality of the control device 102. The OS 326 interfaces with the hardware components of the control device 102 for access by applications and/or software processes executing on top of the OS 326, including a sensor data acquisition module 336, a machine learning module 338, a foam detection module 340, and an anti-foam control module 342.

The sensor data acquisition module 336 acquires sensor data such as movement data from the foam sensor device 104 via the wired and/or wireless interface 328 and sends the sensor data to the machine learning module 338 or the foam detection module 340.

The machine learning module 338 requests and receives the sensor data from the sensor data acquisition module 336 during controlled states, receives controlled state information via the user interface 334, and generates foam models for each controlled state based on the sensor data generated during the controlled state and on the controlled state information provided for the controlled state. Generally, the machine learning module 338 generates the foam models using machine learning and/or signal processing methods. In one example, the machine learning module 338 extracts features of the movement data for each controlled state and classifies the extracted features as being associated with different foam statuses based on the controlled state information.

The non-volatile memory 324 stores the foam models 344 generated by the machine learning module 338.

The foam detection module requests and receives the sensor data from the sensor data acquisition module 336 during normal operation (e.g., during bioreactor runs) and determines the foam status of the vessel based on the sensor data and/or the stored foam models associated with the different foam statuses. In one example, the foam detection module 340 determines that the vessel has a particular foam status in response to determining that the sensor data generated during normal operation (and/or features extracted from the sensor data) most closely matches or corresponds to the foam model for that particular foam status.

The anti-foam control module 342 adds anti-foam solution to the vessel based on the foam status of the vessel by generating instructions based on the foam status and sending the instructions to the anti-foam pump device 106 to activate or deactivate an anti-foam pump.

In many embodiments, control unit 102 is enclosed in a common housing that is external to the reactor. In some situations, functions executed by control unit 102 can be provided by components operating from one or more separate housings.

Figure 4A:
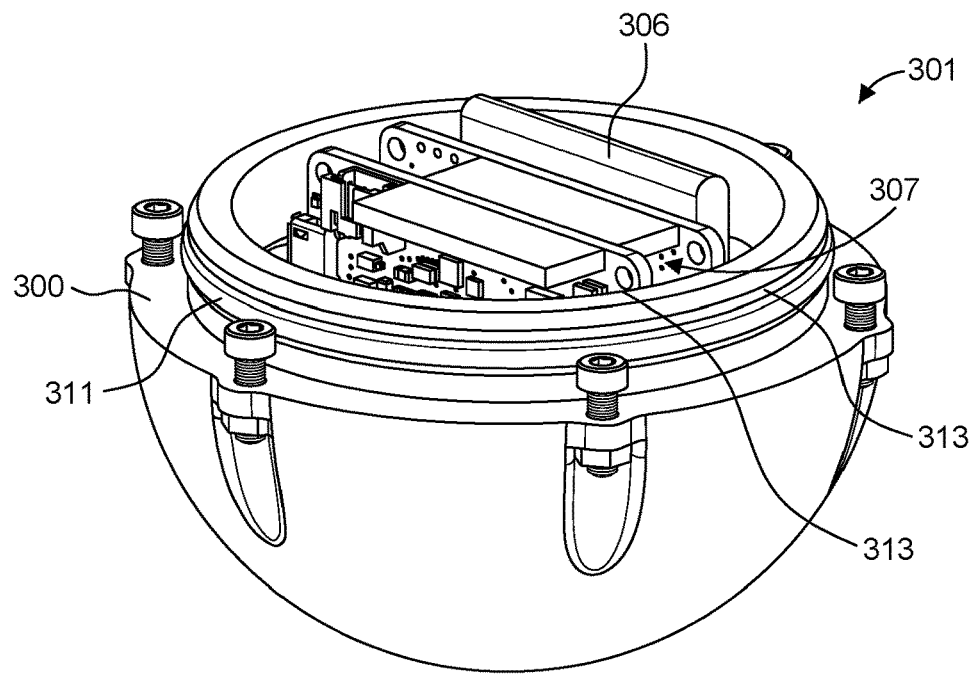
FIG. 4A is a perspective view of a foam sensor device according to one embodiment of the invention, showing a spherical housing of the foam sensor device with a transparent hemispherical portion of the housing removed.

FIG. 4A is a perspective view of a spherical foam sensor device 104 according to one embodiment of the invention.

In the illustrated example, electrical components of the foam sensor device 104 are secured within an opaque, hemispherical lower portion of the water-tight housing 300. A translucent or transparent, hemispherical upper portion of the water-tight housing 300 has been removed and is not shown.

The electrical components include the battery 306, a data acquisition, logging, and wireless transmitting printed circuit board, and an accelerometer printed circuit board. The data acquisition, logging, and wireless transmitting board includes, for example, the controller 302, memory 304, wireless transmitter 310, and antenna 312, while the accelerometer board includes the accelerometer 314.

Figure 4B:
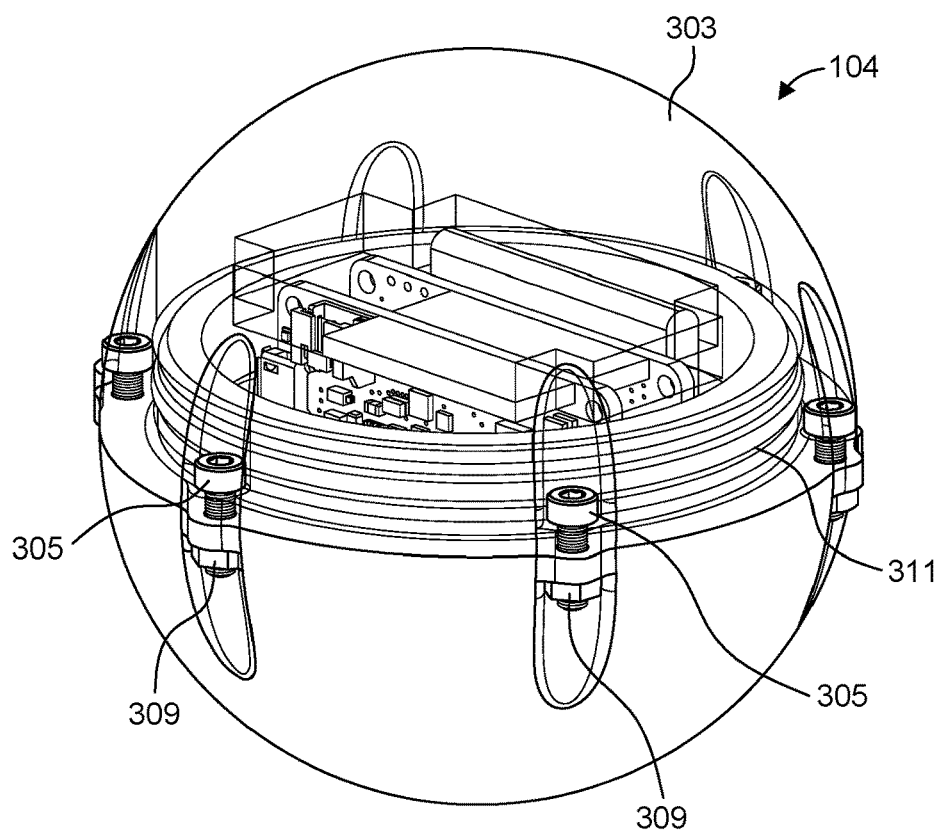
FIG. 4B is a perspective view of the foam sensor device of FIG. 4A showing the full housing of the foam sensor device including the transparent hemispherical portion.

FIG. 4B is a perspective view of the foam sensor device of FIG. 4A showing the fully assembled water-tight housing 300 of the foam sensor device 104, including the transparent hemispherical upper portion 303, which is secured to the lower portion of the housing via an attachment mechanism for attaching (joining) the hemispherical portions together and forming a water-tight seal. In the illustrated example, the attachment mechanism includes six bolts 305 spaced uniformly around a circumference of the spherical housing 300 where edges of the two hemispherical portions come in contact. Nuts 309 tighten onto the bolts to secure the hemispherical portions together to form the fully assembled spherical housing 300. Tightening of the nuts also compresses a ring or gasket 311 formed of elastic material such as rubber provided along an internal ridge 313 of the lower portion that inserts into the hemispherical shell of the upper portion and contacts the interior surface of the hemispherical shell of the upper portion, creating a water-tight seal. Other arrangements can be provided to accommodate the gasket or an O-ring and form a water-tight seal. Some implementations, for instance, employ matching threads on the upper and lower hemispheres; the threads can be engaged to compress an O-ring or gasket secured, e.g., in a suitable groove.

Figure 4C:
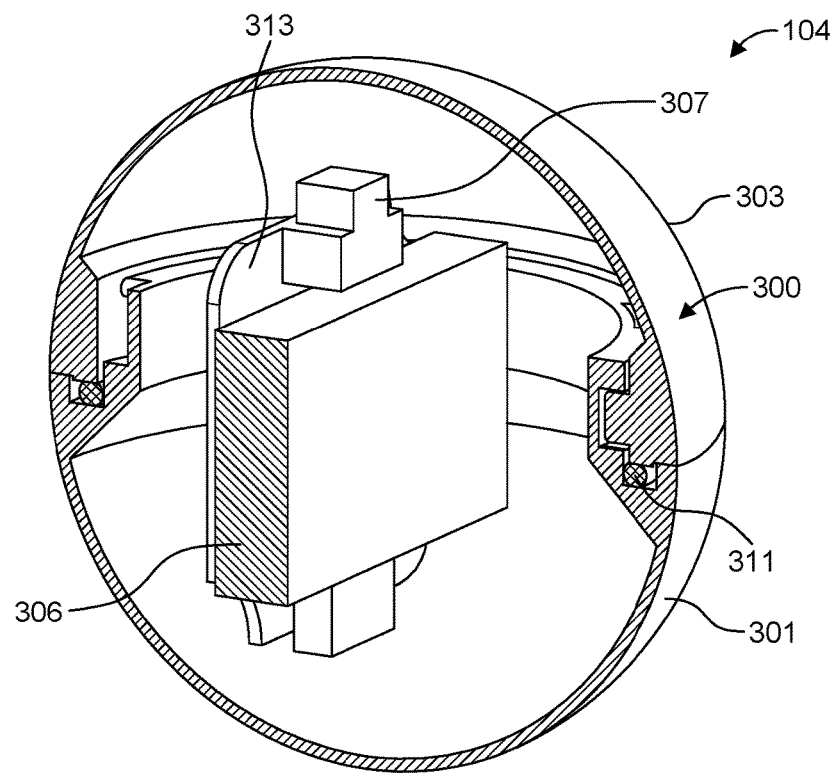
FIG. 4C is a vertical perspective view of components enclosed by the spherical housing.

FIG. 4C is a vertical (in relation to the surface of the liquid) cross sectional view of an assembled foam sensor device 104 showing the components described above.

For many reactor vessels, stirring will induce a vortex; the foam sensor device will tend to center itself in this vortex and most effectively measure axial rotations about the axis that is perpendicular to the surface plane of the liquid contained in the reactor vessel. The shape of the foam sensor device may play a roll on how the device settles in this vortex and how its motion may become affected by foam formation.

Figure 4D:
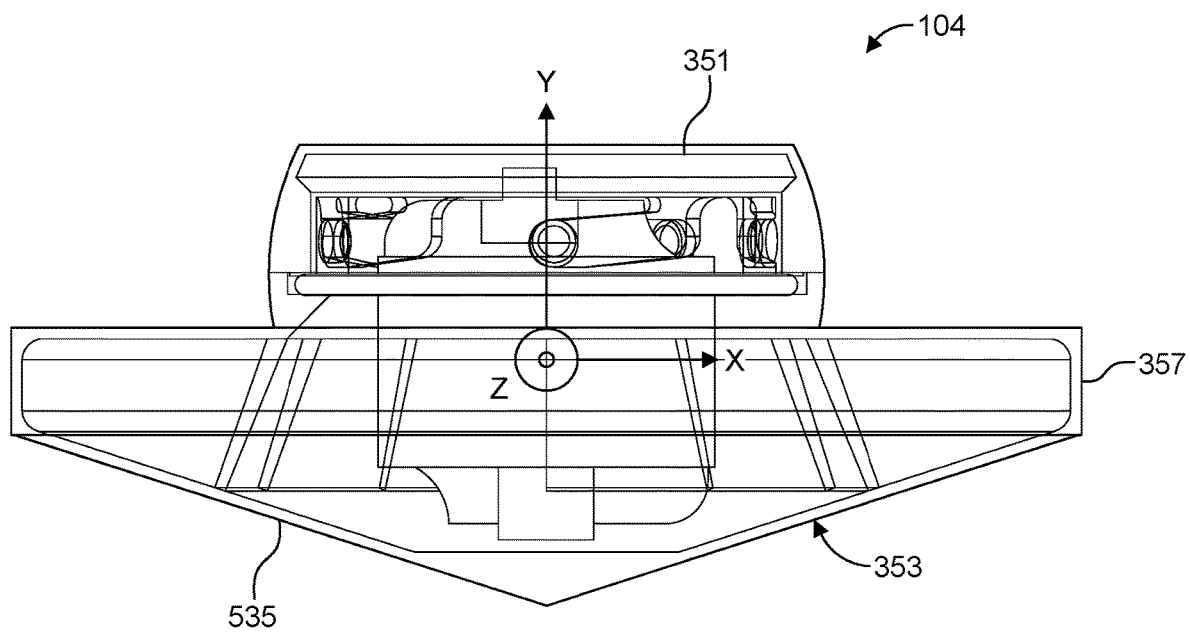
FIG. 4D is a view of a foam sensor device in which the housing includes a conical section.

While FIGS. 4A, 4B and 4C illustrate a spherical (ball) foam sensor device, other shapes are possible. In one embodiment, for instance, the device shell is cylindrical. Another embodiment is directed to a conical foam sensor device such as shown in FIG. 4D. As illustrated in this drawing, components such as described above are enclosed in a housing formed from upper portion 351 and lower portion 353. The latter has a conically shaped bottom 355 and a cylindrical top 357. The two portions can be assembled in water-tight fashion using, for instance, approaches such as described above with reference to FIGS. 4A through 4C. When in a vessel, the cone height aligns with the Y-axis and is perpendicular to the surface of the liquid (X-Z plane).

Without wishing to be bound by a particular interpretation or mechanism, it is believed that a conical shape, especially, in some cases, a relatively flat one (with the cone diameter exceeding (e.g., by a ratio of at least 2:1) the cone height) can be very effective in stabilizing the rolling motion about the x and z axes.

Figure 4E:
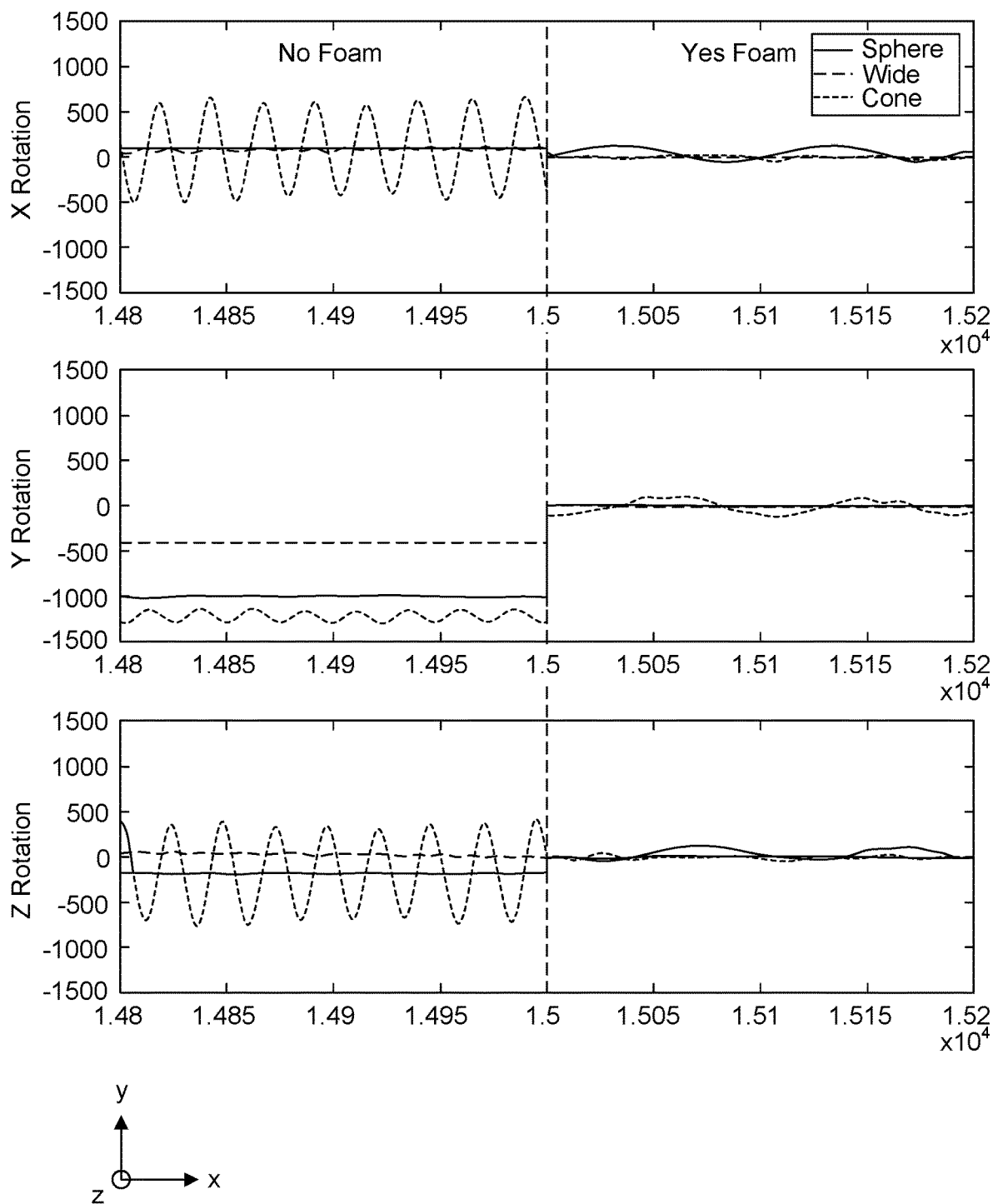
FIG. 4E is a series of plots comparing XYZ axial rotations for "no foam" and "foam" situations using foam sensor devices of different geometries.

FIG. 4E presents comparison data (x-, y- and z-rotations), obtained using foam sensor devices having a spherical shell, a wide conical shell (such as the one in FIG. 4D), and a thin (having a sharper angle, more pencil-like) conical shell. Both conical shapes are considered stable.

Obtaining such comparison data can be useful in determining empirically a preferred shape for a particular application. In one example, the data provides helpful insight in selecting the best device geometry to be incorporated in a particular type of single use reactor. In another example, the slant height of the conical portion of a device is optimized by considering, for example, the type of vortex expected in the vessel.

Figure 5A:
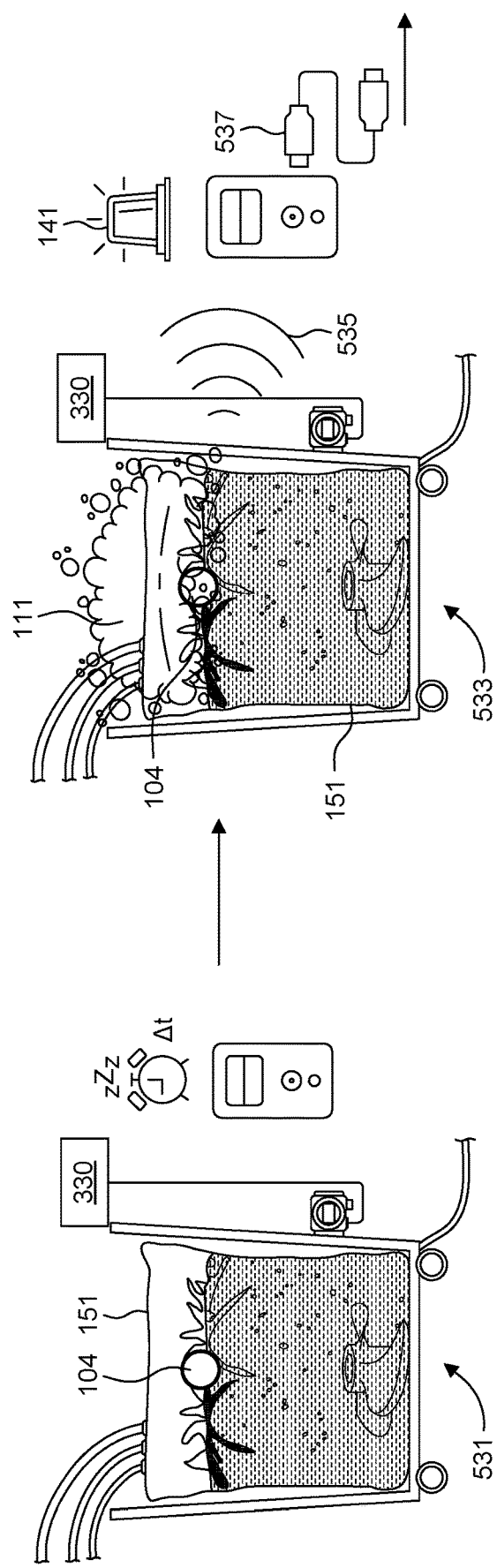
FIG. 5A is a schematic diagram illustrating principles of a foam monitoring method according to an embodiment of the invention.
Figure 5B:
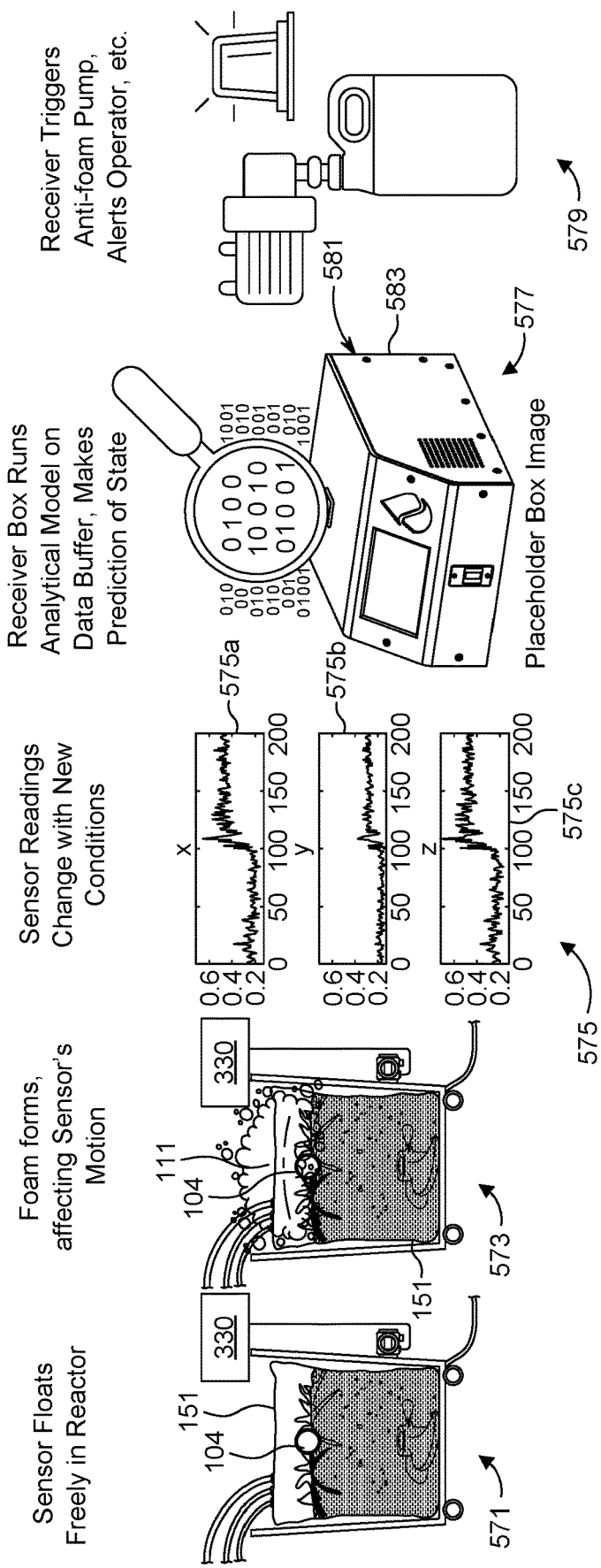
FIG. 5B is a schematic diagram illustrating steps in a foam monitoring method according to an embodiment of the invention.
Figure 5C:
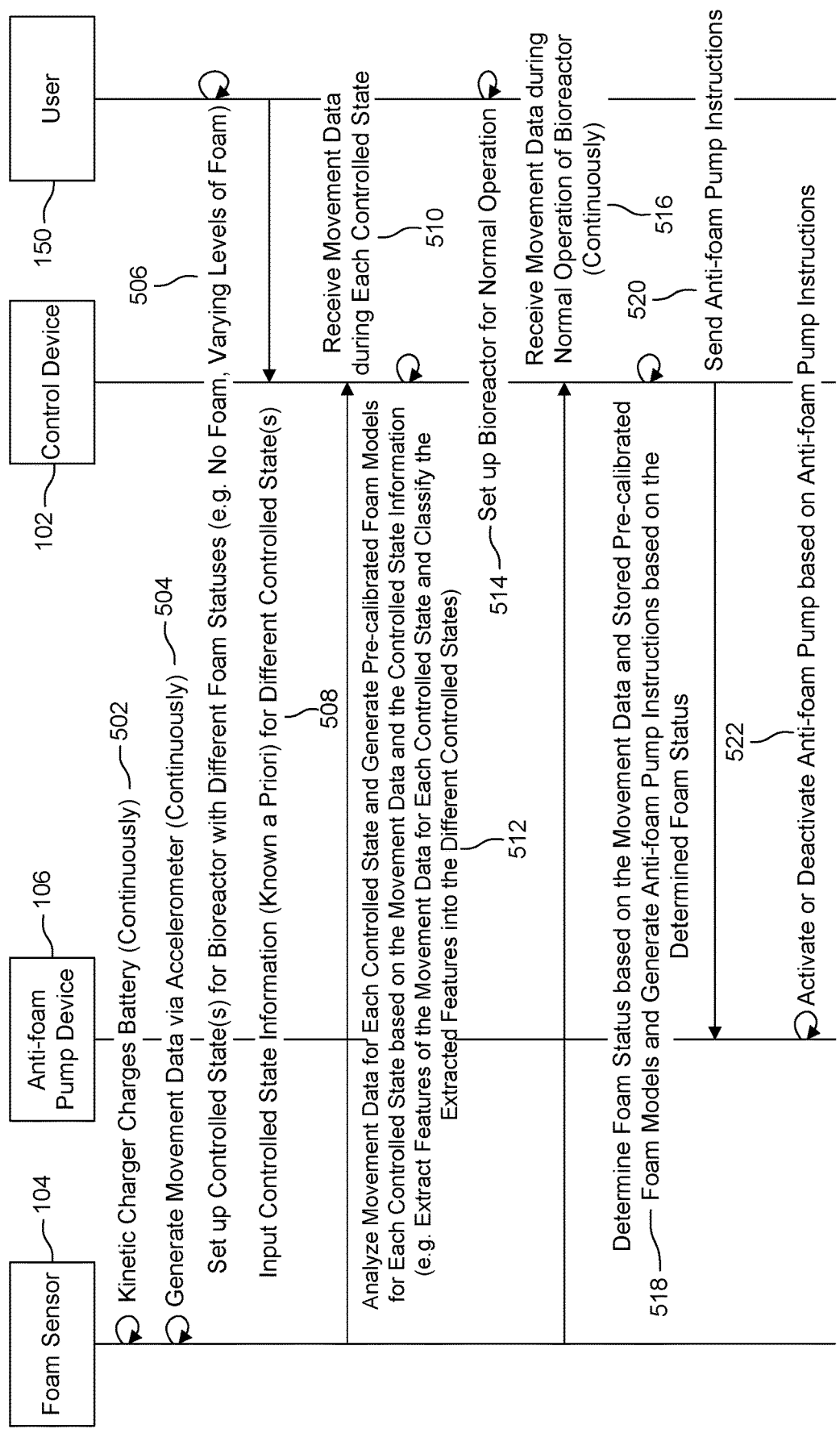
FIG. 5C is a sequence diagram showing a foam monitoring method according to an embodiment of the present invention.

FIGS. 5A and 5B are diagrams illustrating the principles of a foam monitoring method according to embodiments of the present invention; FIG. 5C is a sequence diagram of a foam monitoring method. In some implementations, the sequence presented reflects the entire process or run, which can be conducted continuously, semi-continuously or in batch mode.

Figure 1D:
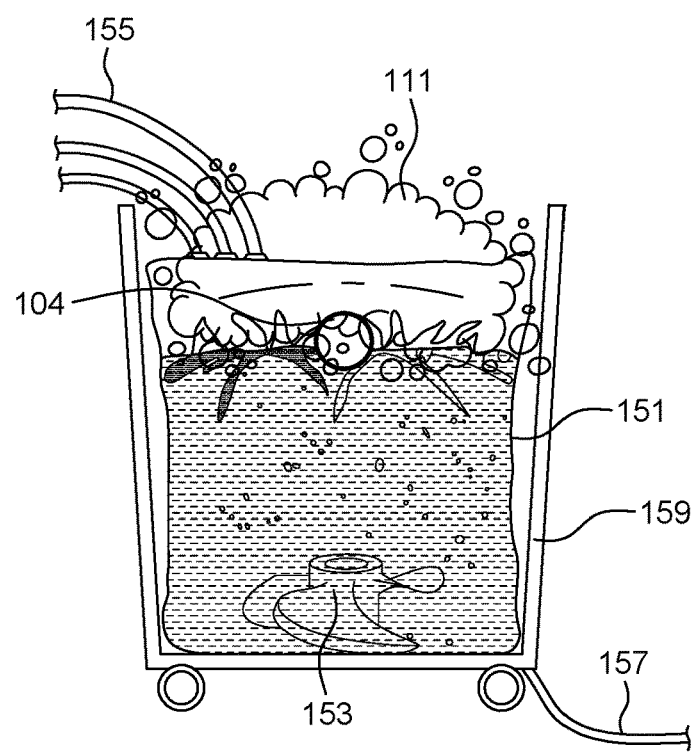
FIG. 1D is a cross sectional view of the exemplary vessel of FIG. 1C showing a build-up of foam above the liquid.

In the illustrated examples, a foam sensor device 104 according to the embodiment illustrated in FIG. 3, for instance, floats on top of a liquid within a vessel, e.g., vessel 101 of FIGS. 1A, 1B, and 2, or vessel 151 of FIGS. 1C and 1D. In the examples depicted, the foam sensor device 104 comprises the accelerometer 314 and generates specifically movement data, as discussed above. In other examples (not illustrated), the foam sensor device 104 comprises different types of sensors and generates different types of sensor data, and the following method is performed using the alternative types of sensor data to calibrate the foam sensor device 104 and to monitor and control the foam status. In some embodiments, foam formation is observable, measured as crossing an arbitrary threshold.

FIG. 5A shows an initial stage 531 during which the bioprocess (conducted in vessel 151, for example) produces no detectable foam. This stage can last for an interval of time (Δt) during which the motion of the foam sensor device 104 is unaffected. In the foam-producing stage 533, foam 111 begins to form and builds up in the vessel, changing the motion of the foam sensor device 104. Using techniques described with reference to FIG. 3, for example, this change is detected (after being transmitted, e.g., by wireless transmission) by an external control unit 102 (FIG. 3), and used as a trigger 535 for an action 537, e.g., generating instructions for delivering anti-foam solution, alerting an operator, issuing a warning, and so forth.

For an initial step 571, FIG. 5B shows sensor 104 floating freely in vessel 151. Its motion changes as foam begins to form (step 573). This change is detected by a wireless receiver 330, external to the vessel, and is reflected in the readings (575a, 575b and 575c) observed in step 575. Receiver box (also referred to herein as "receiver module") 581 (in which housing 583 encloses some or all modules described with reference to control device 102 (FIG. 3), such as, for instance, wireless receiver, NVM, user interfaces, microcontroller, external output, OS, etc.) runs the analytical model on data buffer and makes prediction of state (step 577). In step 579, antifoam control module 342 triggers one or more actions related to the operation of an anti-foam solution pump, operator alerts, warnings, etc.

FIG. 5C is a sequence diagram showing, in step 502, the kinetic charger 308 of the foam sensor device 104 charging the battery 306 of the device continuously (from the movement of the foam sensor device 104 floating on top of the liquid).

Similarly, in step 504, the foam sensor device 104 continuously generates movement data via the accelerometer 314 based on detected movement of the foam sensor device 104 floating on top of the liquid. In one example, the device continuously generates and stores the movement data in the non-volatile memory 304 of the foam sensor device 104. In another example, the foam sensor device 104 continuously generates and transmits the movement data to the control device 102 via the wireless transmitter 310 and antenna 312.

Steps 506 through 512 are related to a calibration process for the foam sensor device 104. In general, this process would repeat for any number of foam statuses (e.g., no foam or varying levels of foam) that need to be identifiable based on the data obtained from the foam sensor device. For example, the calibration process of steps 506 through 512 can be performed for a controlled state in which there is no foam in the vessel and for each of a number of controlled states in which there is a different known amount or level of foam in the vessel.

In step 506, the bioreactor is configured (e.g., by a user 150) to be in a controlled state corresponding to a foam status (e.g., no foam or varying levels of foam). For example, the user 150 sets conditions within the vessel to be one of the different possible foam statuses.

In step 508, the control device 102 receives controlled state information indicating known conditions within the vessel, including the known foam status of the vessel. In one example, the controlled state information is input by the user 150 via the user interface 334. The controlled state information includes the known foam status. It can also include information about conditions in the bioreactor and/or pertaining to the bioprocess. The information can relate to temperature, composition of the liquid and/or gasses within the vessel, liquid level, foam level, pressure, elapsed process time, and/or any attributes or other information that could be relevant to the formation and/or buildup of foam within the vessel.

In step 510, the machine learning module 338 receives the movement data that was generated by the foam sensor device 104 based on the movement of the foam sensor device 104 during the current controlled state for which the calibration process is being performed. In one example, the machine learning module 338 requests the movement data from the foam sensor device 104 via the sensor data acquisition module 336, and in response to the request, the foam sensor device 104 transmits movement data stored in non-volatile memory 304 to the control device 102. In another example, the foam sensor device 104 transmits the movement data continuously or at predetermined intervals, for instance, to the control device 102, and the machine learning module 338 receives streamed movement data or retrieves the movement data from the non-volatile memory 324.

In step 512, the machine learning module 338 analyzes the movement data for the current controlled state and generates a foam model for the current controlled state based on the movement data generated by the foam sensor device 104 during the controlled state and based on the controlled state information. In one example, the machine learning module 338 extracts features from the movement data for the current controlled state and classifies the extracted features as being associated with the foam status indicated by the controlled state information. The machine learning module 338 then stores the generated foam model 344 in non-volatile memory 324.

In this way, during the calibration process, the machine learning module 338 generates pre-calibrated foam models 344 to be used for determining the foam status of the vessel during normal operation of the bioreactor (e.g., during actual bioreactor runs). As previously pointed out, this calibration process can be repeated for any number of different controlled states.

Turning to normal operation of the bioreactor, in step 514, the bioreactor is configured (e.g., by the user 150) to be in its normal operating mode. For example, the bioreactor is configured with initial conditions pertaining to a bioreactor process to be carried out, and the bioreactor process is started. Although the initial conditions within the vessel, including the foam status, may be known at the start of the bioreactor process, these conditions will typically change during the run. Thus, the subsequent steps (to be described) are directed to determining the foam status and controlling the foam level via anti-foam solution. In many cases, these steps are performed repeatedly at several points throughout the bioreactor run. For example, steps 516 through 522 can be performed repeatedly at predetermined time intervals from the start of the bioreactor process until the process terminates or the foam monitoring is no longer required.

In step 516, the foam detection module 340 receives the movement data generated by the foam sensor device 104 based on the movement of the foam sensor device 104 during normal operation. In one example, the foam detection module 340 requests the movement data from the foam sensor device 104 via the sensor data acquisition module 336; in response to the request, the foam sensor device 104 transmits movement data stored in non-volatile memory 304 to the control device 102. In another example, the foam sensor device 104 transmits the movement data continuously or at predetermined intervals to the control device 102, and the foam detection module 340 receives streamed movement data or retrieves the movement data from the non-volatile memory 324.

In step 518, the foam detection module 340 determines the current foam status of the vessel based on the movement data generated during normal operation of the bioreactor and based on the stored foam models 344 associated with different foam statuses. In one example, the foam detection module 340 determines that the vessel has a particular foam status, a status arrived at by determining that the sensor data generated during normal operation (and/or features extracted from the sensor data) that most closely matches or correspond to the foam model for that particular foam status. The anti-foam control module 342 receives the foam status determined by the foam detection module 340 and generates anti-foam pump instructions based on the foam status.

In step 520, the anti-foam control module 342 sends the anti-foam pump instructions to the anti-foam pump device 106.

Finally, in step 522, the anti-foam pump device 106 activates or deactivates the anti-foam pump based on the anti-foam instructions. In one example, activating the anti-foam pump causes anti-foam solution to be added to the vessel for as long as the pump is activated, and deactivating the anti-foam pump causes anti-foam solution to no longer be added to the vessel for as long as the pump is deactivated.

In this way, during normal operation of the bioreactor, the control device 102, via the foam detection module 340 and the anti-foam control module 342, monitors foam levels in the vessel during a bioreactor process to detect when foam is building up and adds anti-foam solution automatically, at an appropriate level, based on the current foam status within the vessel.

Figure 6:
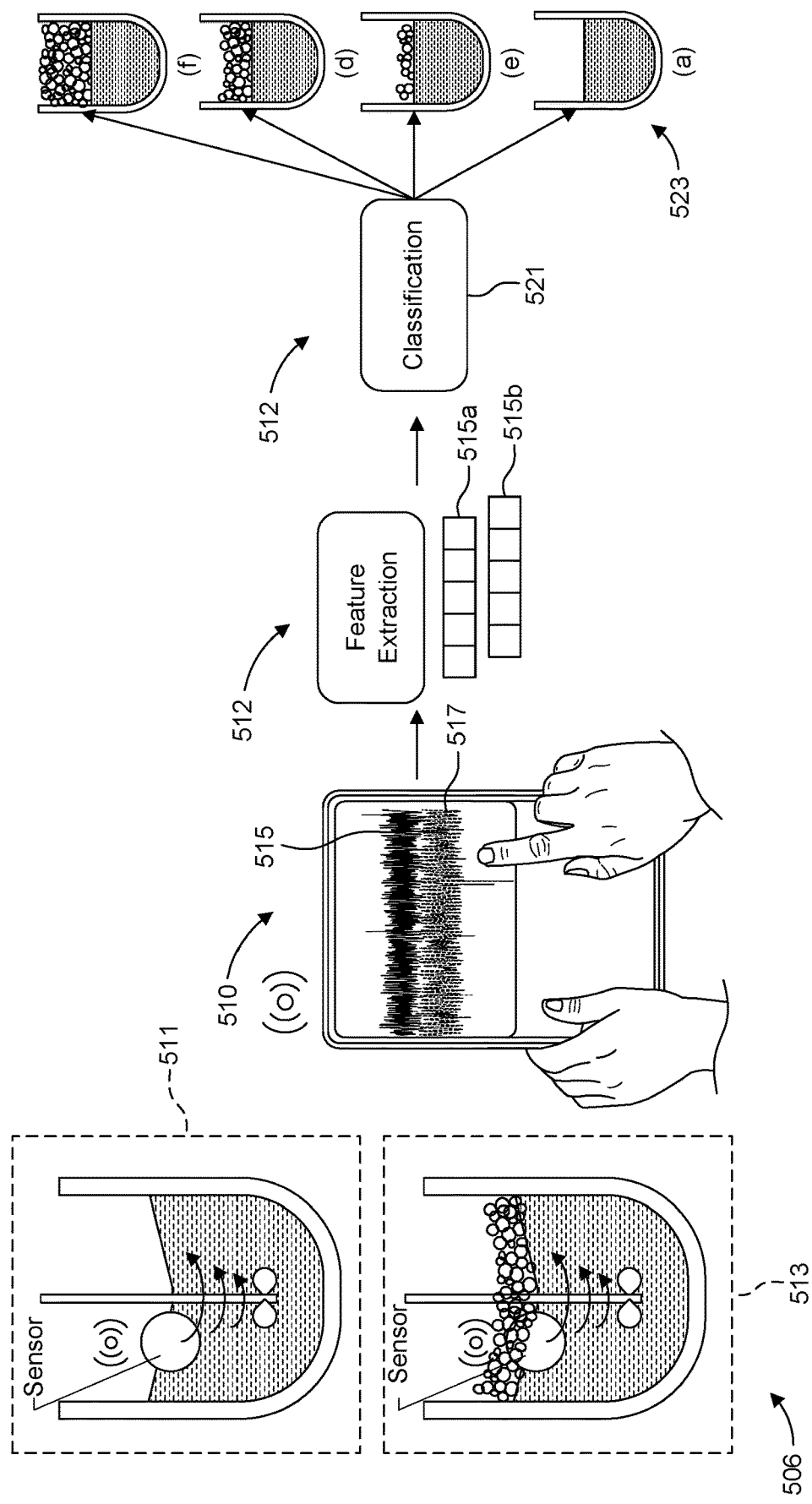
FIG. 6 is a diagram illustrating an exemplary process of calibrating the foam monitoring system.

FIG. 6 is a diagram illustrating the process of calibrating the foam monitoring system as described, for example, in steps 506 through 512 of FIG. 5C. As previously described, first, the foam sensor device 104 is observed in controlled states where the status of the foam is known (and provided in the form of controlled state information). Then, the sensor data (e.g., movement data), including signals within the sensor data, are processed using machine learning and/or signal processing methods. Features are extracted from the sensor data and are classified into the different states, resulting in models that can be tested and validated on new incoming data. For example, the ability of the foam models to predict the system state (e.g., foam status, foam level) can be continually evaluated and improved by testing the foam models against new incoming sensor data either during bioreactor runs or further controlled states.

In more detail, step 506 illustrates controlled state 511 (no foam) and controlled state 513, in which foam is present, at different known levels, for example. These states generate movement data 515 (no foam) and 517 (foam) in step 510, while the analysis (step 512) involves feature extraction 519 to obtain extracted features 515a (no foam) and 515b (foam). The analysis step 512 also involves a classification operation 521. Illustrative pre-calibrated foam models 523 are shown for vessel conditions (a), (d), (e) and (f) of FIG. 2.

Figure 7:
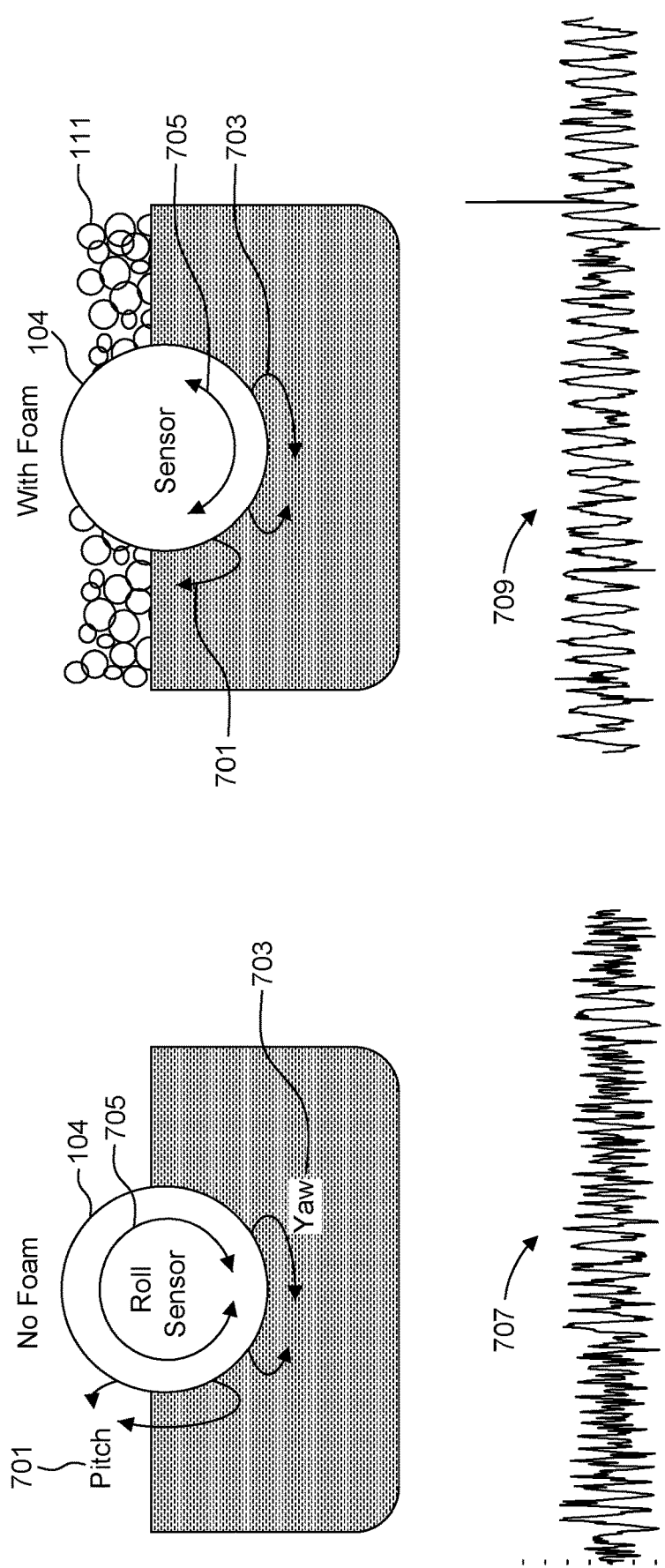
FIG. 7 is a diagram illustrating exemplary movement data generated by the foam sensor device.

FIG. 7 is a diagram illustrating exemplary movement data generated by an embodiment of the foam sensor device 104 comprising the accelerometer 314.

As previously described, the movement data received from the foam sensor device 104 during the controlled states is analyzed via an accelerometer-based machine learning process (e.g., as described in step 512 of FIG. 5C).

This movement data generally indicates acceleration of the foam sensor device 104 along an x-, y-, and z-axis and rotation of the foam sensor device 104 including pitch 701, yaw 703, and roll 705.

In general, different foam statuses (e.g., no foam, varying levels of foam) would be expected to affect this movement of the foam sensor device 104 in different ways.

Analysis of the movement data can be performed based on a two-dimensional case with a single plane of rotation (e.g., pitch 701 or yaw 703). For example, when there is no foam within the vessel, the spherical housing 300 of the foam sensor device 104 will roll randomly, with some periodic components due to the speed of the impeller spinning the fluid. This tendency would be reflected in the movement data generated during a "no foam" controlled state, including extracted features of the movement data such as the exemplary graphical depiction of the device's pitch 707 as shown in the plot illustrated in the bottom left.

On the other hand, when there is foam within the vessel, the movement of the spherical housing 300 would exhibit observable dampening, with some of the rotations (e.g., pitch) becoming more oscillatory. This tendency would be reflected in the movement data generated during a "with foam" controlled state, including extracted features of the movement data such as the exemplary graphical depiction of the device's pitch 709 as shown in the plot illustrated in the bottom right.

Figure 8:
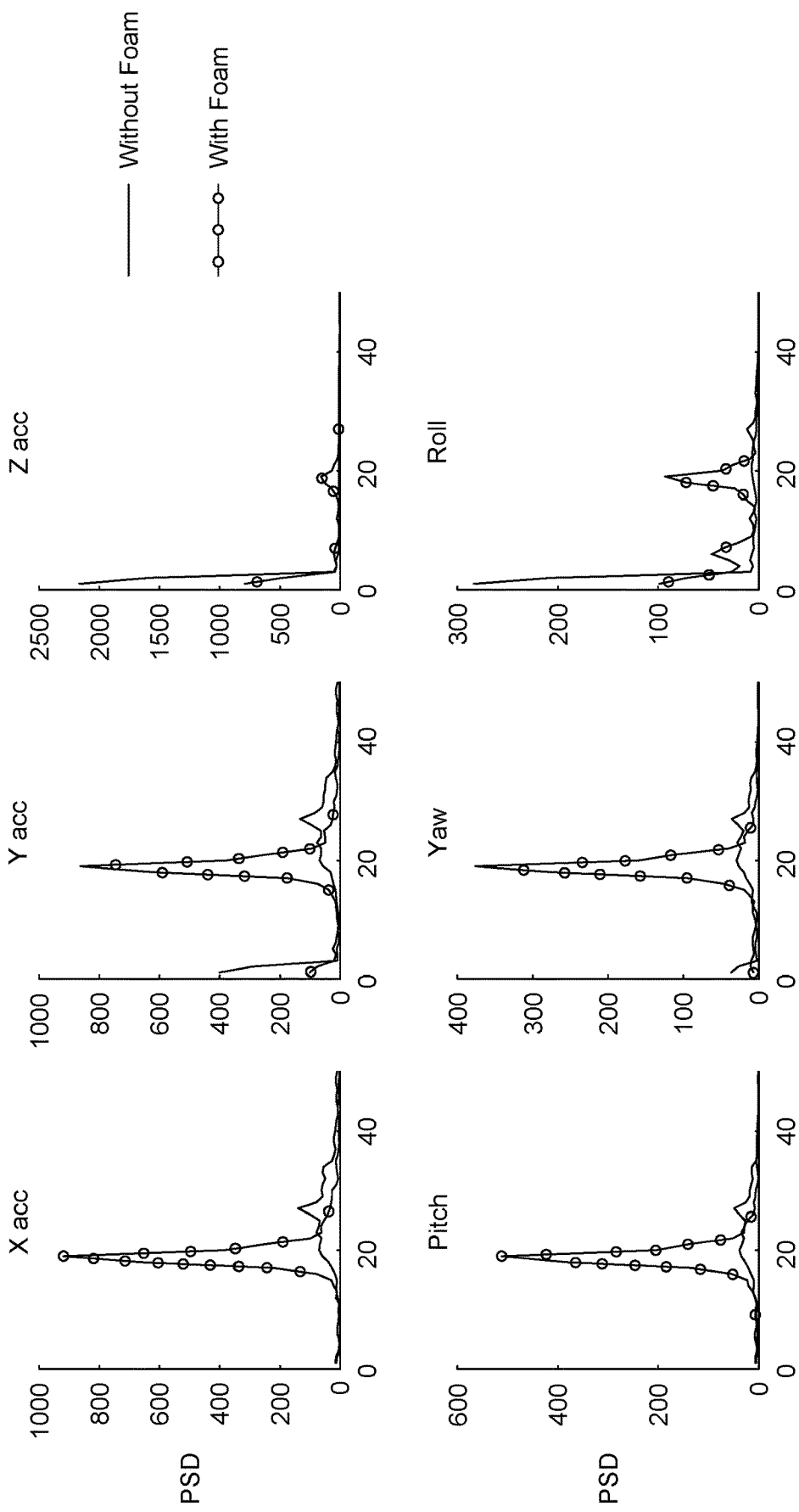
FIG. 8 is a series of graphs depicting exemplary analysis of the movement data.

FIG. 8 provides a series of graphs depicting exemplary analysis of the movement data, for example, to extract features. In general, such analysis can be initially quantified (e.g., without machine learning) through frequency analysis and the Power Spectral Density (PSD or pWelch) of the data with and without foam.

In the illustrated example, there is a graph for each acceleration along the x-axis, acceleration along the y-axis, and acceleration along the z-axis, pitch, yaw, and roll. Each graph includes two exemplary plots of movement data: one with foam and one without foam. Each of the graphs shows the PSD for the with foam (closed circles plots) and without foam (straight line) exemplary movement data for each of x-, y-, and z-axis acceleration (upper row of graphs), and pitch, yaw, and roll (lower row of graphs).

Generally, differences between exemplary data for the "with foam" and "without foam" conditions indicated in the graphs can be used to identify features of the movement data that can be extracted for the purpose of generating the foam models for the different foam statuses and determining the current foam status based on the foam models.

Concerning the plots depicted in FIGS. 7 and 8, the sensor data generated by an accelerometer, especially in a rotational package such as the spherical housing 300, would be indicative of the viscosity of the liquid or fluid present in the vessel. Any oscillations that are occurring due to the requisite stirring in a bioreactor will either dampen or constructively grow due to foam. Sensing these oscillations over time at the site of formation like the surface of the liquid provides direct access to that dampening.

Figure 9:
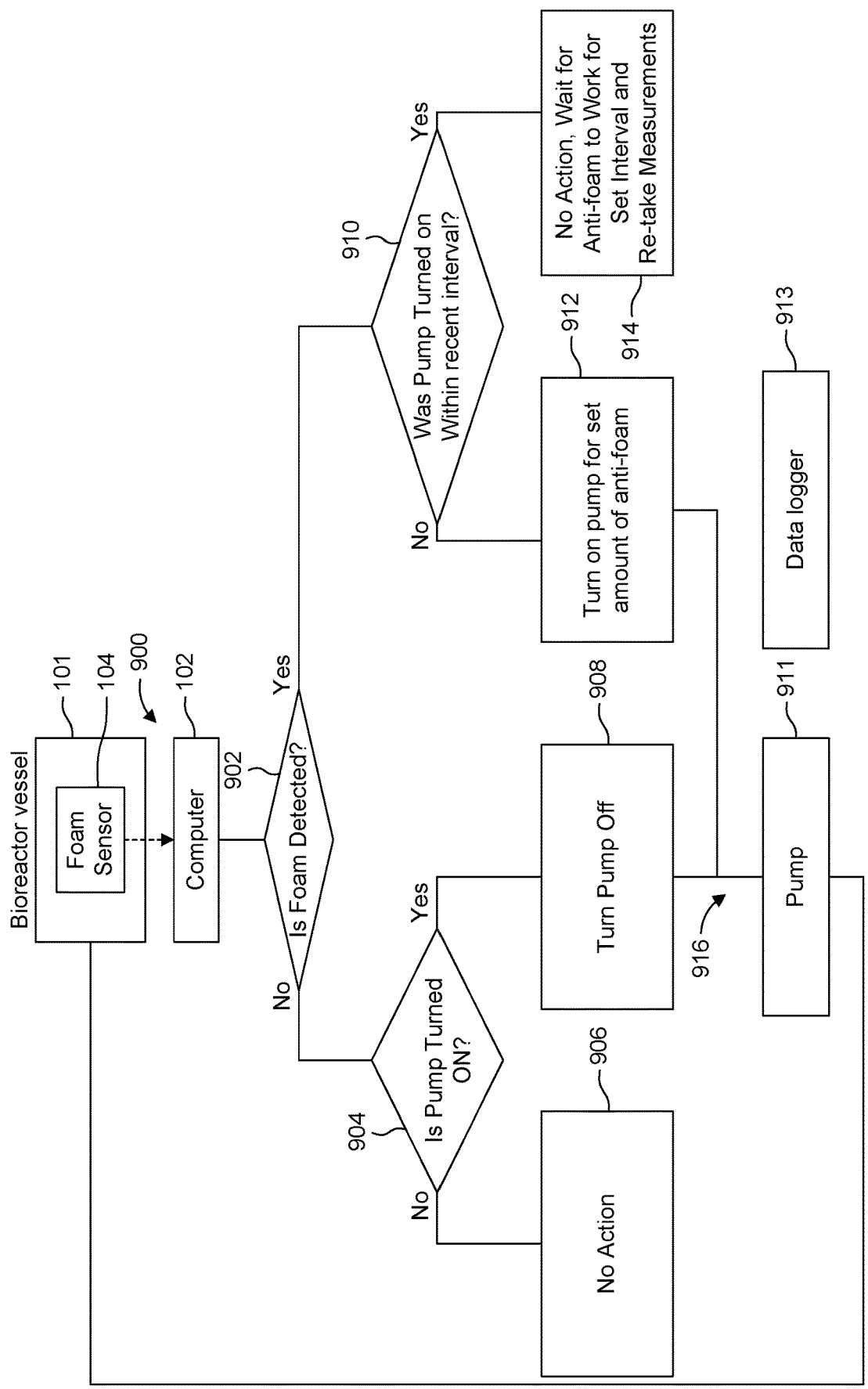
FIG. 9 is a flow diagram showing a process of controlling an anti-foam pump device based on a foam status of the vessel.

FIG. 9 is a flow diagram showing a process (e.g., performed by the anti-foam control module 342) of controlling the anti-foam pump device 106 based on a foam status of the vessel (as determined by the foam detection module 340, for instance). This process generally corresponds to steps 518 through 522 of the method illustrated in and described with respect to FIG. 5.

First, in step 900, the foam sensor device 104 generates the sensor data and transmits the sensor data to the control device 102 (e.g., a "computer").

In step 902, it is determined (for example, by the foam detection module 340 of FIG. 3) whether foam is detected within the vessel, e.g., vessel 101 of FIGS. 1A and 1B.

If foam is not detected, in step 904, it is determined (e.g., by the anti-foam control module 342 of FIG. 3) whether the anti-foam pump 911 is currently activated or turned on. If not, no action is taken in step 906. On the other hand, if the anti-foam pump 911 is turned on, the anti-foam control module 342 generates instructions for turning off the anti-foam pump in step 908.

If foam was detected (in step 902), it is determined (e.g., by the anti-foam control module 342) whether the anti-foam pump 911 (under instructions from anti-foam pump device 106) was recently activated or turned on within a predetermined interval of time. If not, the anti-foam control module 342 generates instructions in step 912 indicating that the anti-foam pump 911 should be turned on to deliver a predetermined amount of anti-foam solution; the instructions can also specify a predetermined amount of time for supplying anti-foam solution. On the other hand, if the anti-foam pump 911 was turned on recently within the predetermined interval of time, no action is taken in step 914, as the anti-foam control module 342 waits for the anti-foam solution to work for a set interval of time, after which the process repeats at step 900 with a new set of measurements and movement data.

In step 916, the anti-foam instructions generated in steps 908 and 912 are transmitted to the anti-foam pump device 106 (see FIG. 3), which executes the instructions by deactivating or turning off the anti-foam pump 911 or activating or turning on the anti-foam pump 911 to release a predetermined amount of solution and/or release the solution for a predetermined period of time.

In this way, the anti-foam control module 342 is employed to automatically add anti-foam solution to the vessel at an appropriate level, without adding an excessive amount that is not necessary and/or might adversely impact the bioreactor run and/or the bioreactor itself.

Actions performed, parameters of interest, and so forth can be recorded by data logger 913.

Figure 10:
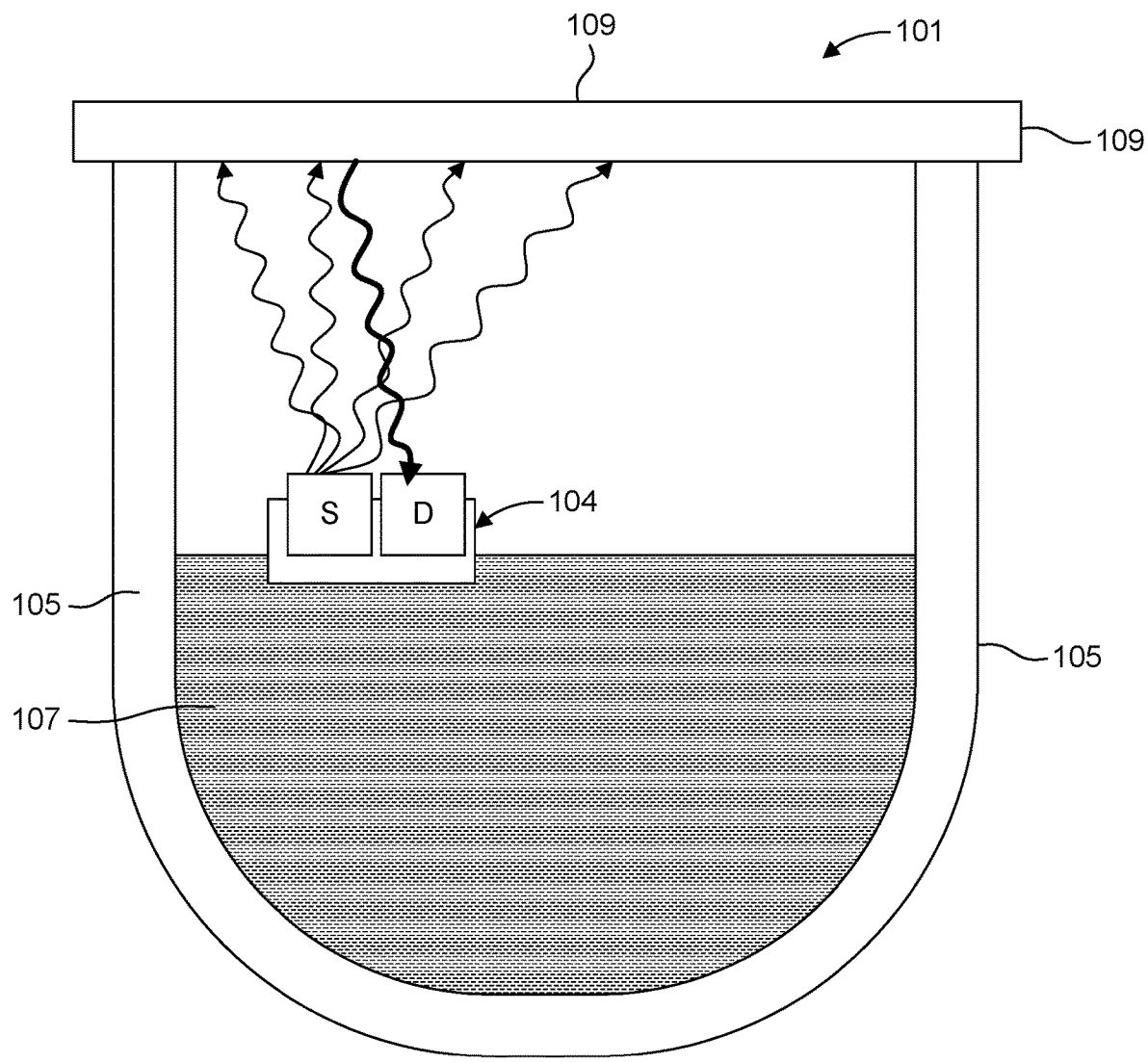
FIG. 10 is a cross sectional view of an exemplary vessel showing a foam sensor device according to an alternative embodiment of the invention.
Figure 11:
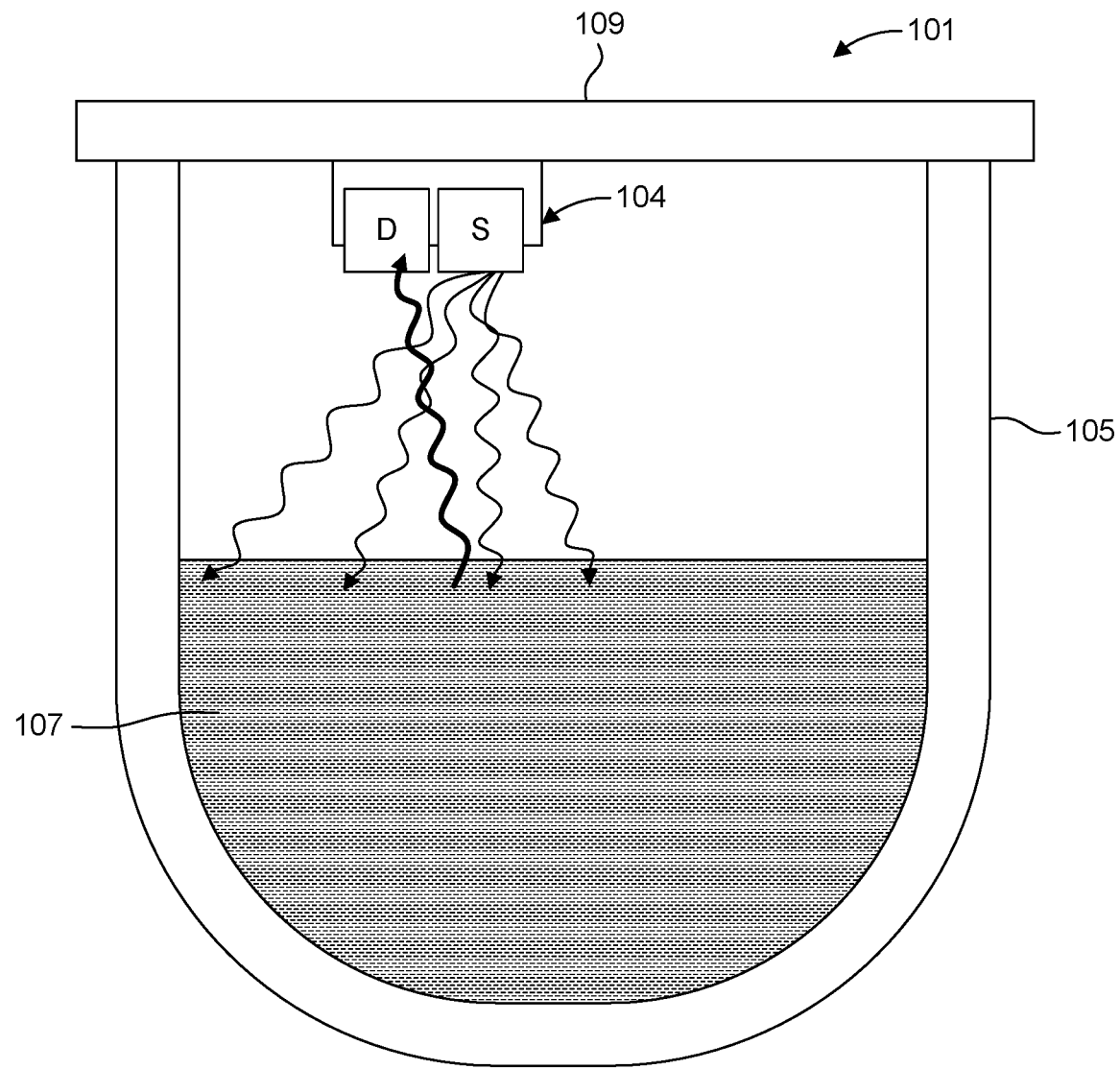
FIG. 11 is a cross sectional view of an exemplary vessel showing a foam sensor device according to an alternative embodiment of the invention.
Figure 12:
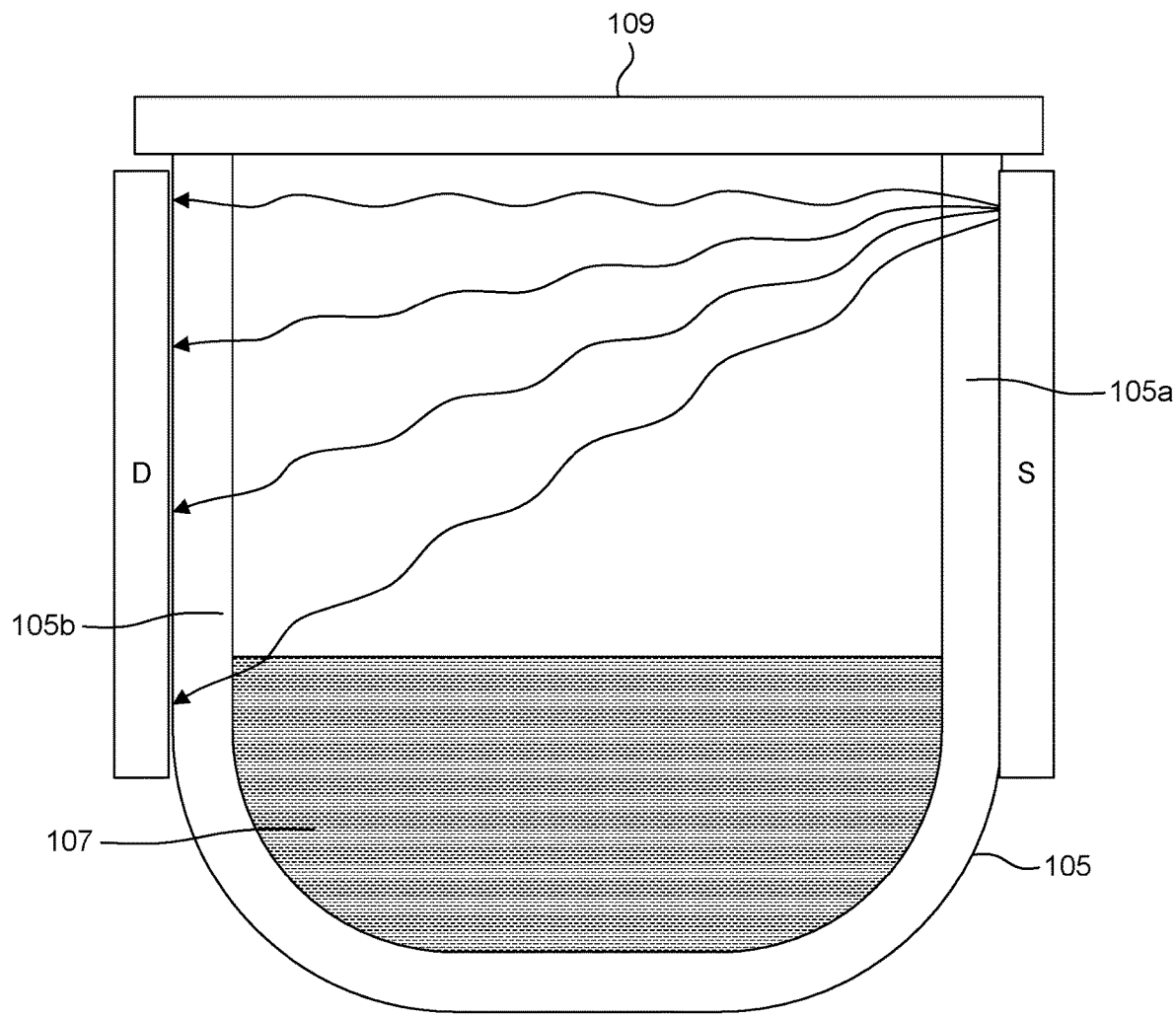
FIG. 12 is a cross sectional view of an exemplary vessel showing a foam sensor device according to an alternative embodiment of the invention.

In general, FIGS. 10-12 show examples of alternative embodiments for the foam sensor device 104. In each example, the device includes a source emitter S and a detector D arranged in various positions relative to components of the vessel, to the liquid, and/or to the components themselves with respect to each other. The source emitter S emits a signal in one of a variety of possible media including radiofrequency electromagnetic waves, sound, or visible light (e.g., from a light-emitting diode (LED)). Ideally, the source is inexpensive and emits in a medium that is optimally selected for penetrating bubbles of any foam built up within the vessel while also exhibiting observable interference from the bubbles. In one example, the source is a vertical-cavity surface-emitting laser (VCSEL) with emission in wavelengths of 1310 nm or 1550 nm. The foam sensor device 104 generates sensor data based on the signal captured by a suitable detector D, including any interference from foam and/or bubbles.

More particularly, FIG. 10 is a cross sectional view of an exemplary vessel (vessel 101 of FIGS. 1A and 1B, for instance) showing an alternative embodiment of the foam sensor device 104 in which the entire device, including both the source emitter S and the detector D, floats on top of the liquid 107 such that it maintains its position above the liquid. The source emitter S emits the signals upward, through foam if there is any, such that a portion of emission is reflected by the headplate 109 back to the detector D, which captures the signal.

FIG. 11 is a cross sectional view of an exemplary vessel (e.g., vessel 101) showing an alternative embodiment of the foam sensor device 104 in which the entire device, including both the source emitter S and the detector D is attached to the bottom, internal surface of the headplate 109 of the vessel. In this example, the source emitter S emits the signals downward, through foam, if any is present, such that a portion of emission is reflected by the liquid back to the detector D, which captures the signal.

The emitted signals can be optical, acoustic or radiofrequency including extending into the GHz frequencies.

Finally, FIG. 12 is a cross sectional view of an exemplary vessel showing an alternative embodiment of the foam sensor device 104 in which the source emitter S is attached to an external surface of one vessel wall (e.g., vessel wall 105a), and the detector D is attached to an external surface of an opposing vessel wall 105b. In this example, the source emitter S emits the signals through the vessel wall, which is transparent with respect to the signal, into the vessel, through foam if any is present, to the detector D, which captures the signal. (For a flexible vessel, the detector D can be attached to an external surface of the reactor, e.g., an external surface of reactor 159 in FIGS. 1C and 1D. Here, the source emitter S can be an LED strip emitting visible light, for example. The LED strip would emit the light randomly into the vessel at different levels (e.g., LEDs at different heights). Based on which level source LED is emitting, the detector D can reconstruct the signal and determine both the liquid level and the bubble or foam level (using Bayesian methods, for example). One potential advantage offered by this embodiment of the foam sensor device 104 is eliminating the need for autoclaving or sterilizing the device between uses.

Other arrangements are possible.

Embodiments of the invention are further illustrated by the following nonlimiting examples.

Example 1

Figure 13A:
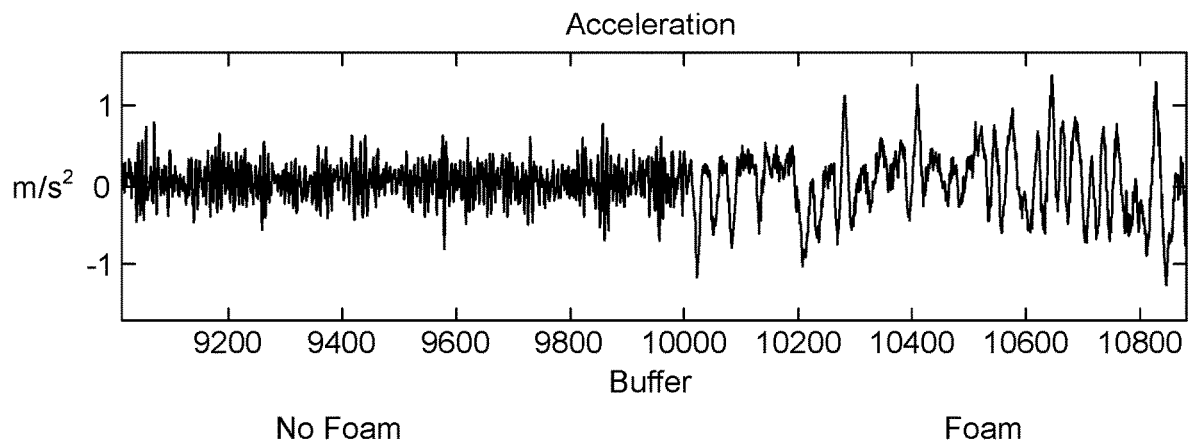
FIGS. 13A, 13B and 13C present XYZ acceleration plots for "no foam" and "foam situations.
Figure 13B:
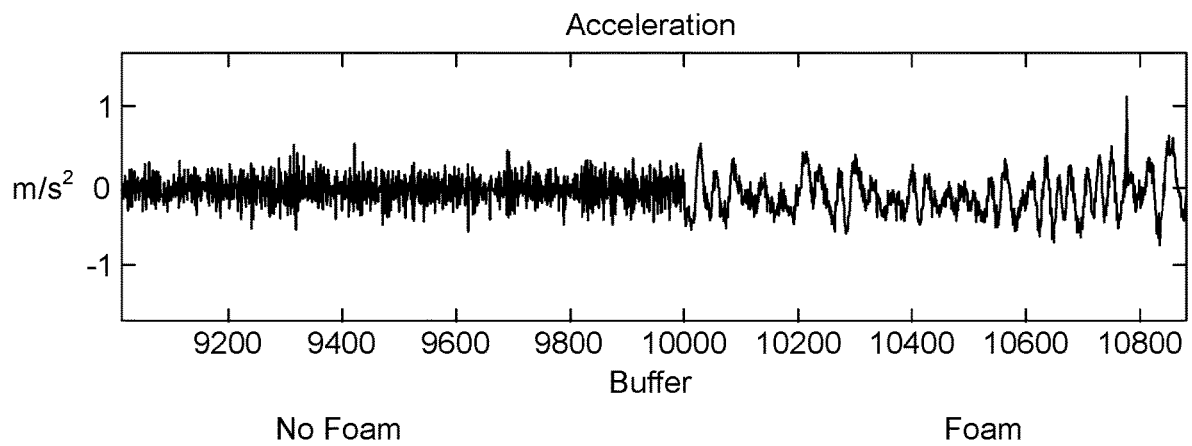
Figure 13C:
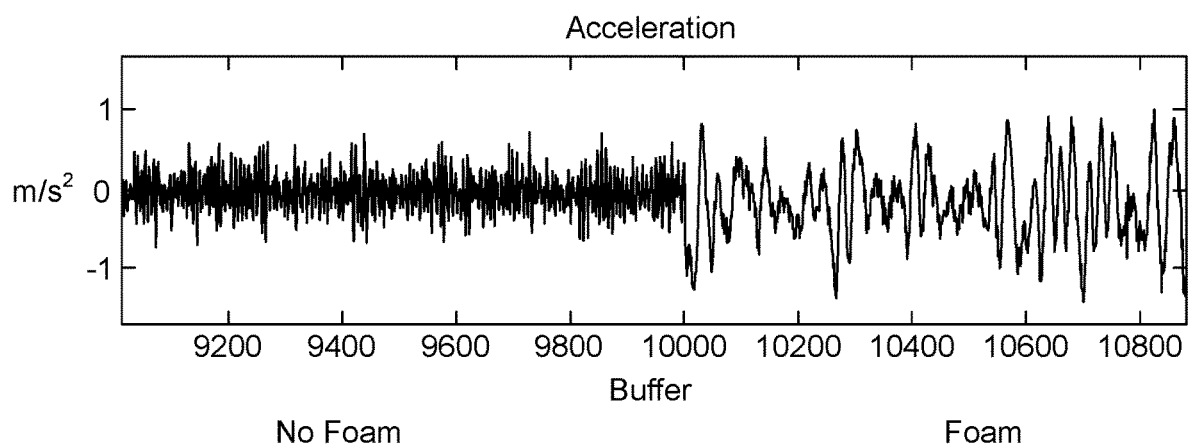

How a state characterized by the presence of foam can be distinguished from one in which foam is absent can rely on monitoring features that are chosen and calculated based on their ability to distinguish a difference in foam state. This is illustrated in FIGS. 13A, 13B and 13C for instance, in which foaming is indicated by a change in acceleration ($m/s^2$) data, XYZ.

Figure 14A:
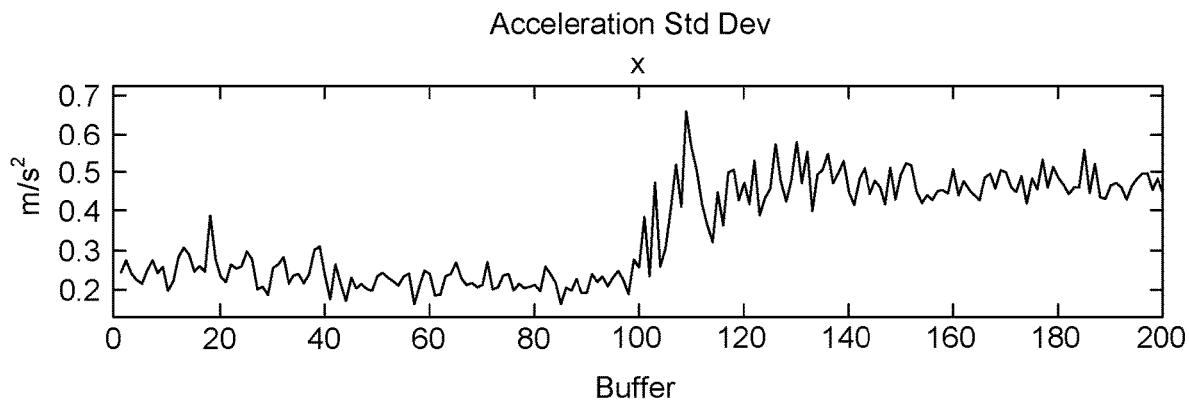
FIGS. 14A, 14B and 14C present XYZ acceleration standard deviation plots for "no foam" and "foam situations.
Figure 14B:
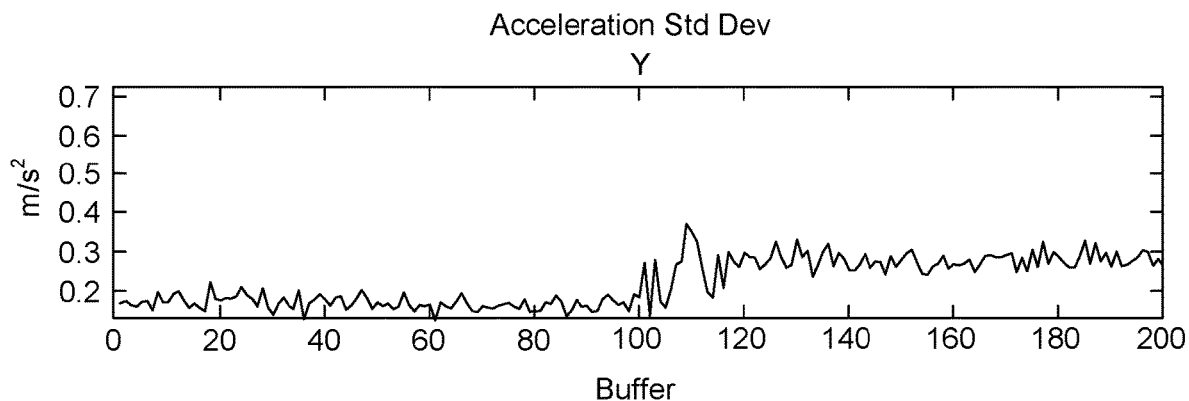
Figure 14C:
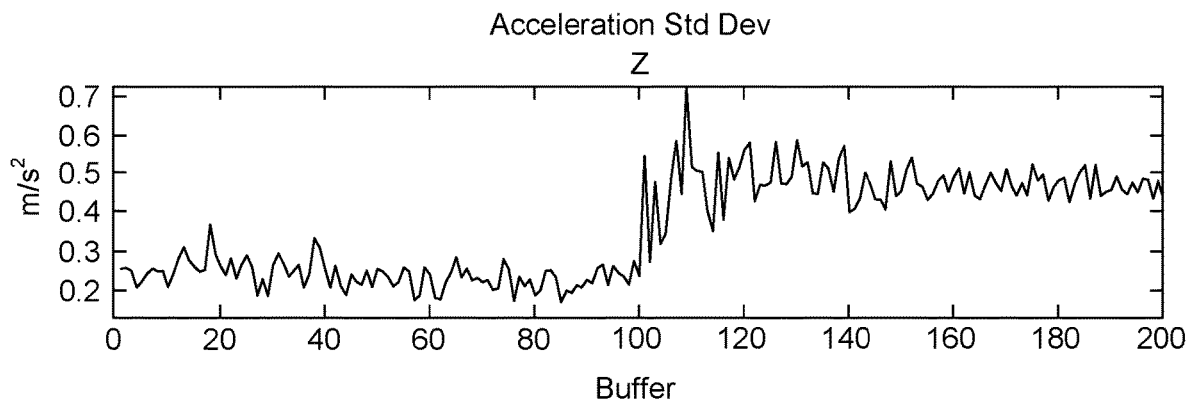

In more detail, an IMU can be used to sample 6DOF acceleration and rotation data at a frequency of 10 Hz. Samples can be collected into buffers of a duration sufficient to return several calculated features. In one experiment, 10 seconds was considered a suitable duration. The model uses the features from the data buffer and generates a prediction. The appropriate modules in control device 102 (FIG. 3, for instance) process the prediction signals and trigger an external response. A standard deviation change in acceleration ($m/s^2$), XYZ axes, for data buffers in the range of 0 to 200 is presented in FIGS. 14A, 14B and 14C.

Figure 15A:
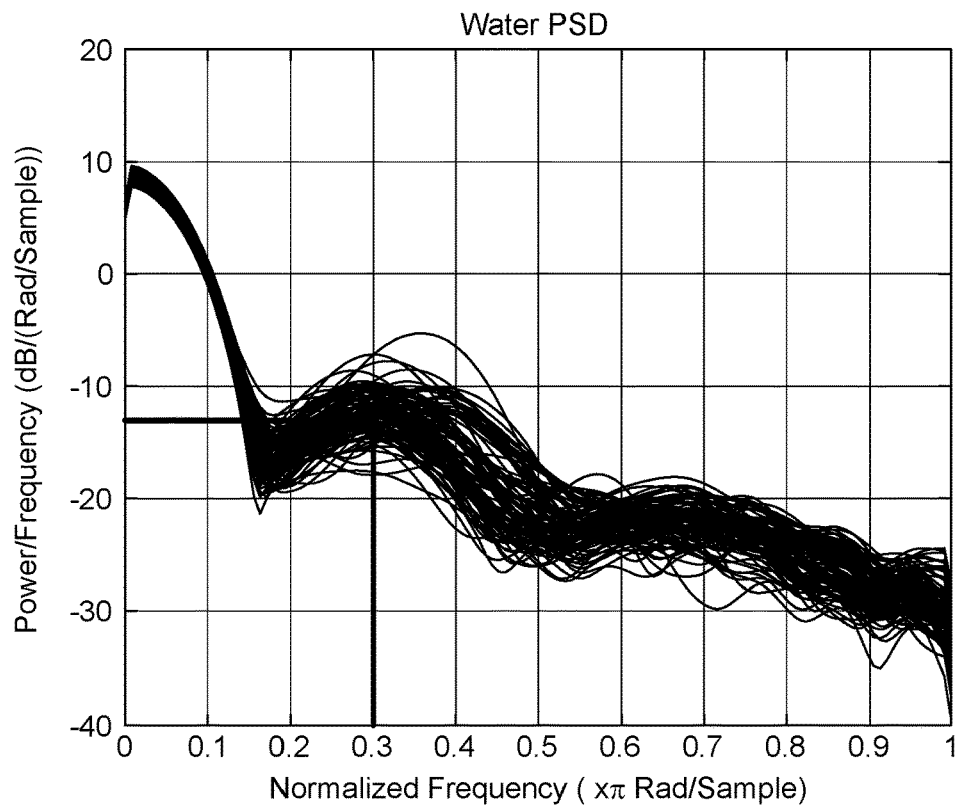
FIG. 15A is a plot of power spectral densities (PSD) for water (no foam) using a 6DOF IMU (inertial measurement unit)
Figure 15B:
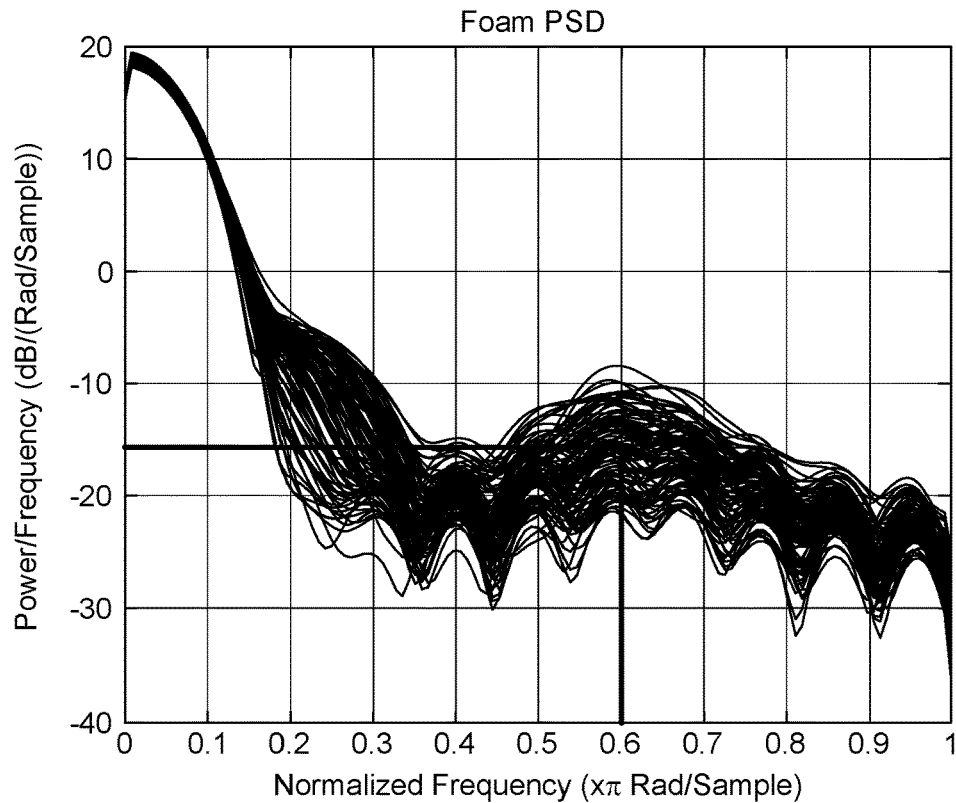
FIG. 15B is a plot of the power spectral density (PSD), using a 6DOF IMU, for a situation in which foam is present.

The power spectral densities (PSD) for water (no foam) and foam are shown, respectively, in FIGS. 15A and 15B.

The measurements described above represent different aspects that can be used to analyze the foam state. PSD, acceleration, and other information can be obtained from the accelerometer and used as "training" data to detect the presence or absence of foam. The various aspects also appeared to display interesting sensitivities related to sensor form factors (spherical shape, wide conical, narrow conical, etc.). Depending on the form factor, some variables may be found to be more sensitive to foam and thus can be exploited more readily.

Example 2

The behavior of interest in this example pertained to oscillations in the X/Z plane (the plane corresponding to the surface of the liquid in the vessel). The technique employed relied on RMS (root mean square) to display amplitude values in a specified window of stack data. An experiment that used a wide shell foam sensor device such as illustrated in FIG. 4D, at a rotation speed suitable for the bioreactor (e.g., not too fast to harm cells and not too slow to prevent oxygenation), generated data for "no foam" and "foam" situations. Both FIGS. 16A (acceleration (m/s$^2$) and 16B (rotation (deg/s) revealed a long-term oscillation, with a period of about 22 seconds, for the "no foam" case. A longer-term oscillation, with a period of about 64 seconds, appeared in the acceleration data for the "foam" case. This longer period in the plot of FIG. 16A was not observed in the rotation plot of FIG. 16B. Without wishing to be bound by a particular explanation, it is possible that the origin of the longer-term oscillation (period of about 64 seconds) may be due to bulk movement of the fluid in the vessel.

Figures 16A, 16B, 16C, 16D:
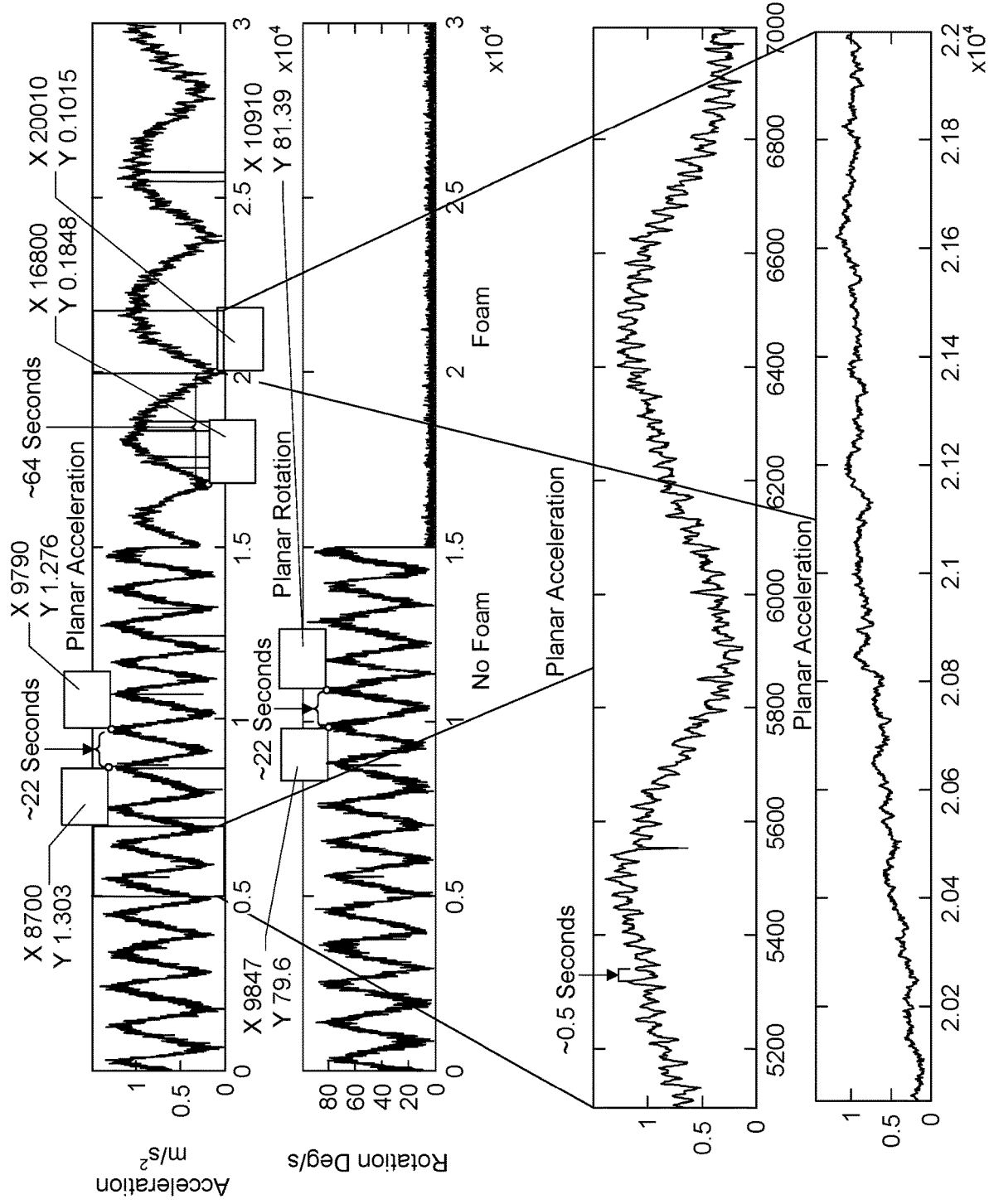
FIG. 16A is a plot showing oscillations in acceleration in the X-Z plane for "no foam" and "foam" cases.
FIG. 16B is a plot showing oscillations in rotation (X-Z plane) for the "no foam" and "foam" cases of FIG. 16A.
FIG. 16C is an expanded plot showing short-term oscillations occurring within the long-term oscillations in the "no foam" regime of FIG. 16A.
FIG. 16D is an expanded plot of short-term oscillations occurring within the long-term oscillations in the "foam" regime of FIG. 16A.

FIGS. 16C and 16D are expanded plots of specific time intervals in the acceleration data FIG. 16A. For instance, FIG. 16C reveals a short-term oscillation of about 0.5 seconds for the pre-foam regime. This value is believed to match the speed of the vortex movement in the foam-free fluid. FIG. 16D presents expanded data for half a period in the acceleration "foam" regime of FIG. 16A.

Information such as obtained in this experiment can be used to trigger various actions related to the operations aimed at controlling foam build-up in the vessel.

Example 3

Figure 17:
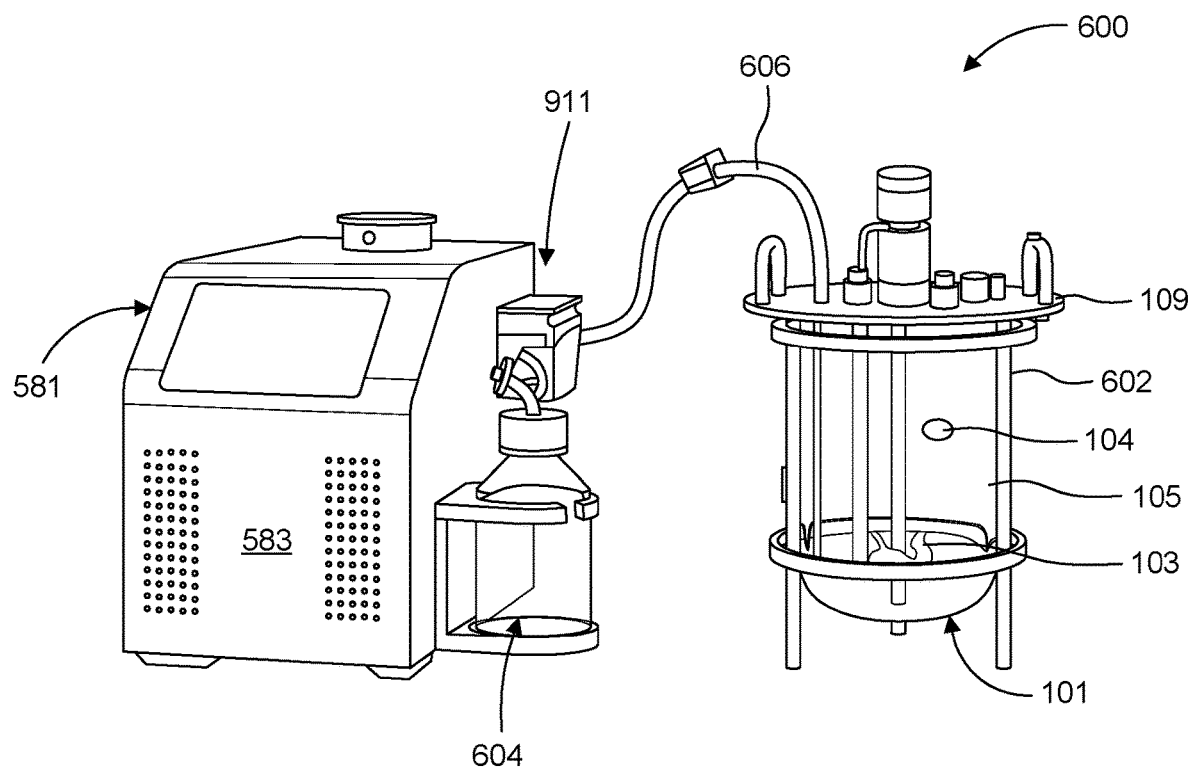
FIG. 17 is an illustration of an arrangement that can be used to address foam formation in a reactor vessel.

This example illustrates a system in which foam formation can be detected and mitigated. Shown in FIG. 17 is arrangement 600 including vessel 101 which is part of a stir tank bioreactor 602. The vessel has walls 105 and is covered by headplate 109. The contents in the vessel are agitated by impeller 103.

Reactions taking place in vessel 101 tend to generate foam. Foam formation is detected by foam sensor device 104, essentially as described above. Information about the presence or absence of foam detected by foam sensor device 104 is transmitted (e.g., by wireless communication) to receiver box 581, in which housing 583 encloses at least some of the components of control unit 102 (FIG. 3). If foam is detected and reaches a preset level, pump 911 is activated and conveys anti-foam solution from container (bottle) 604 to vessel 101 via conduit 606. The pumping action is stopped once foam level is reduced, e.g., to a preset level.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for monitoring foam within a vessel, the method comprising:
   detecting movement of a sensor device within the vessel via an accelerometer;
   generating movement data based on the detected movement; and
   determining a foam status of the vessel based on the movement data, wherein the movement data indicates acceleration along an x-, y-, and z-axis and rotation information including pitch, yaw, and roll.

2. The method of claim 1, wherein the sensor device floats on liquid contained within the vessel and comprises a water-tight housing.

3. The method of claim 1, further comprising determining the foam status based on the movement data and stored foam models associated with different foam statuses.

4. The method of claim 3, further comprising generating the foam models using machine learning and/or signal processing methods.

5. The method of claim 1, further comprising adding anti-foam solution to the vessel based on the foam status.

6. The method of claim 1, wherein the vessel is part of a bioreactor.

7. A method for monitoring foam within a vessel, the method comprising:
   detecting movement of a sensor device within the vessel via an accelerometer;
   generating movement data based on the detected movement;
   determining a foam status of the vessel based on the movement data;
   determining the foam status based on the movement data and stored foam models associated with different foam statuses; and
   generating the foam models based on controlled state information for one or more controlled states of the vessel, during which the foam status of the vessel is known, and movement data is generated during the one or more controlled states.

8. The method of claim 7, wherein the generating the foam models based on the controlled state information and the movement data generated during the one or more controlled states comprises extracting features of the movement data for each controlled state and classifying the extracted features as being associated with different foam statuses based on the controlled state information.

9. A system for monitoring foam within a vessel, the system comprising:
   a sensor device within the vessel, the sensor device comprising an accelerometer for generating movement data based on detected movement of the sensor device; and
   a detection module for determining a foam status of the vessel based on the movement data, wherein the movement data indicates acceleration along an x-, y-, and z-axis and rotation information including pitch, yaw, and roll.

10. The system of claim 9, wherein the sensor device floats on liquid contained within the vessel and comprises a water-tight housing.

11. The system of claim 9, wherein the detection module determines the foam status based on the movement data and stored foam models associated with different foam statuses.

12. The system of claim 11, further comprising a machine learning module for generating the foam models using machine learning and/or signal processing methods.

13. The system of claim 11, further comprising a machine learning module for generating the foam models based on controlled state information for one or more controlled states of the vessel, during which the foam status of the vessel is known, and movement data generated during the one or more controlled states.

14. The system of claim 9, further comprising an anti-foam control module for adding anti-foam solution to the vessel based on the foam status.

15. The system of claim 9, wherein the vessel is part of a bioreactor.

16. A system for monitoring foam within a vessel, the system comprising:

a sensor device within the vessel, the sensor device comprising an accelerometer for generating movement data based on detected movement of the sensor device;

a detection module for determining a foam status of the vessel based on the movement data, wherein the detection module determines the foam status based on the movement data and stored foam models associated with different foam statuses; and a machine learning module for generating the foam models based on controlled state information for one or more controlled states of the vessel, during which the foam status of the vessel is known, and movement data generated during the one or more controlled states, wherein the machine learning module generates the foam models based on the controlled state information and the movement data generated during the one or more controlled states by extracting features of the movement data for each controlled state and classifying the extracted features as being associated with different foam statuses based on the controlled state information.

17. A sensor device for monitoring foam within a vessel, the sensor device comprising:

an accelerometer for generating movement data based on detected movement of the sensor device, wherein a detection module determines a foam status of the vessel based on the movement data; and a battery for providing power to the sensor device and a kinetic charger for charging the battery from the movement of the sensor device.

18. The sensor device of claim 17, further comprising a wireless transmitter for transmitting the movement data to a control device, which executes the detection module.

19. A method for monitoring foam within a vessel, the method comprising:

detecting movement of a sensor device within the vessel via an accelerometer;

generating movement data based on the detected movement;

determining a foam status of the vessel based on the movement data;

calibrating the sensor device in one or more controlled states of the vessel for which a known foam status is provided;

building and storing a foam model that correlates movement data from the accelerometer to respective foam statuses; and wherein determining the foam status of the vessel comprises comparing the movement data generated during normal operation of the vessel to the stored foam model.

20. A method for monitoring foam within a vessel, the method comprising:

detecting movement of a sensor device within the vessel via an accelerometer;

generating movement data based on the detected movement; and determining a foam status of the vessel based on the movement data, wherein:

the sensor device is enclosed in a water-tight housing that floats on liquid contained within the vessel;

the accelerometer tracks multi-axis movement of the sensor device; and the foam status is updated in real time based on how foam formation alters the movement data relative to a baseline motion profile in the absence of foam.

* * * * *